(12) United States Patent
Knox

(10) Patent No.: US 9,894,415 B2
(45) Date of Patent: Feb. 13, 2018

(54) SYSTEM AND METHOD FOR MEDIA EXPERIENCE DATA

(71) Applicant: Gregory Knox, Los Angeles, CA (US)

(72) Inventor: Gregory Knox, Los Angeles, CA (US)

(73) Assignee: Gregory Knox, Los Angeles, CA (US)

( * ) Notice: Subject to any disclaimer, the term of this patent is extended or adjusted under 35 U.S.C. 154(b) by 0 days.

(21) Appl. No.: 15/188,997

(22) Filed: Jun. 22, 2016

(65) Prior Publication Data

US 2017/0374414 A1 Dec. 28, 2017

(51) Int. Cl.
*H04H 60/33* (2008.01)
*H04N 21/442* (2011.01)
*H04N 21/475* (2011.01)

(52) U.S. Cl.
CPC . *H04N 21/44218* (2013.01); *H04N 21/44204* (2013.01); *H04N 21/4756* (2013.01)

(58) Field of Classification Search
CPC ......... H04N 21/44218; H04N 21/4756; H04N 21/44204
USPC .......................................................... 725/10
See application file for complete search history.

(56) References Cited

U.S. PATENT DOCUMENTS

| | | | | |
|---|---|---|---|---|
| 2007/0271580 A1* | 11/2007 | Tischer | ................... | H04H 60/07 725/35 |
| 2009/0195392 A1* | 8/2009 | Zalewski | ................ | G06F 3/012 340/573.1 |
| 2012/0309515 A1* | 12/2012 | Chung | ................. | H04N 21/274 463/31 |
| 2013/0335226 A1* | 12/2013 | Shen | ...................... | H04R 5/033 340/573.1 |
| 2015/0121418 A1* | 4/2015 | Jain | ...................... | H04N 21/812 725/32 |

* cited by examiner

*Primary Examiner* — Michael B Pierorazio
(74) *Attorney, Agent, or Firm* — Sheridan Ross P.C.

(57) ABSTRACT

A system for passive collection of media experience data to increase efficiencies in identifying and delivering desired media content. Behavioral data measured with a wearable device and camera sensors, including physical activity and physiological data, may be captured during a media content presentation and analyzed with media contextual and experiential data to measure media experience data and render media connectedness values between a subject and the presented media content. A system may operate on a network with access to a web service program and utilize mechanized learning and artificial intelligence to compare the previously analyzed media experience data with contextual data associated with media content available on searchable databases. The system may share media experience data and analyzed results with a social network group which can use the media connectedness value data intelligence to refine search methods for media content. The system's learning capabilities, for managing the described ongoing data collection ecosystem, will increasingly improve interpretive and analytic insights of a subject, their preferred choices media content, and the optimal conditions and environment for presenting specific media content with little or no input from the subject.

29 Claims, 20 Drawing Sheets

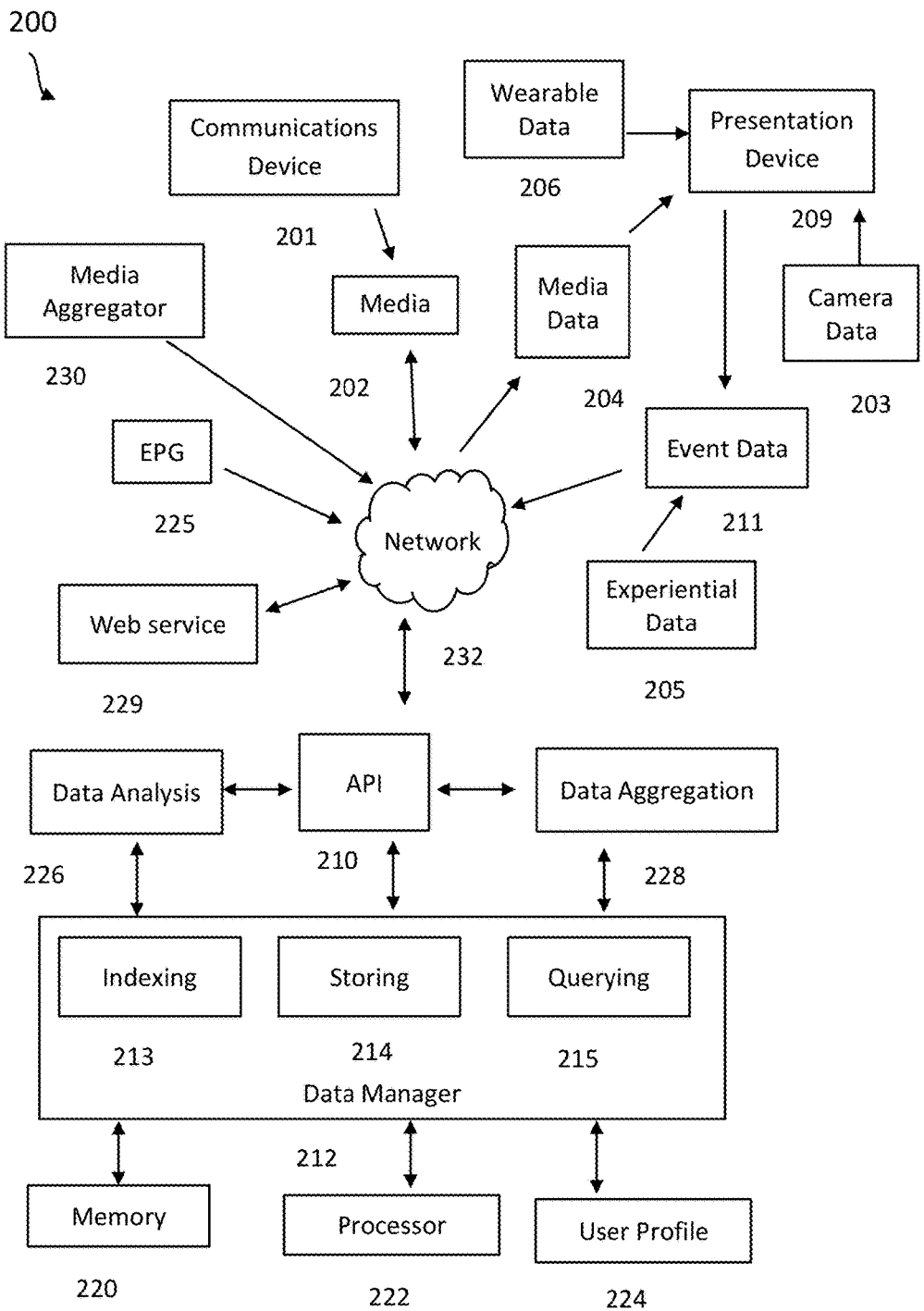
FIGURE 2-A

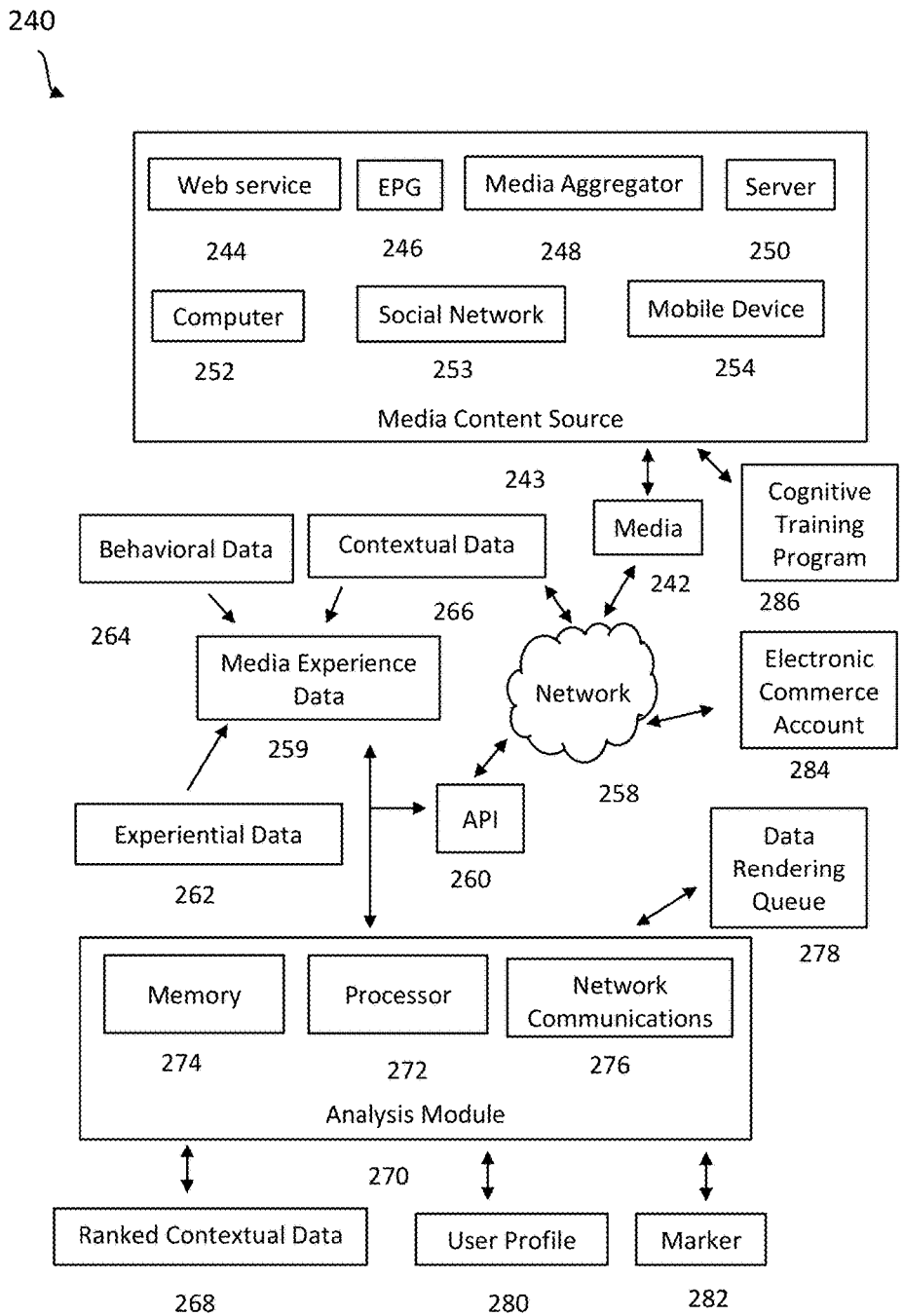
FIGURE 2-B

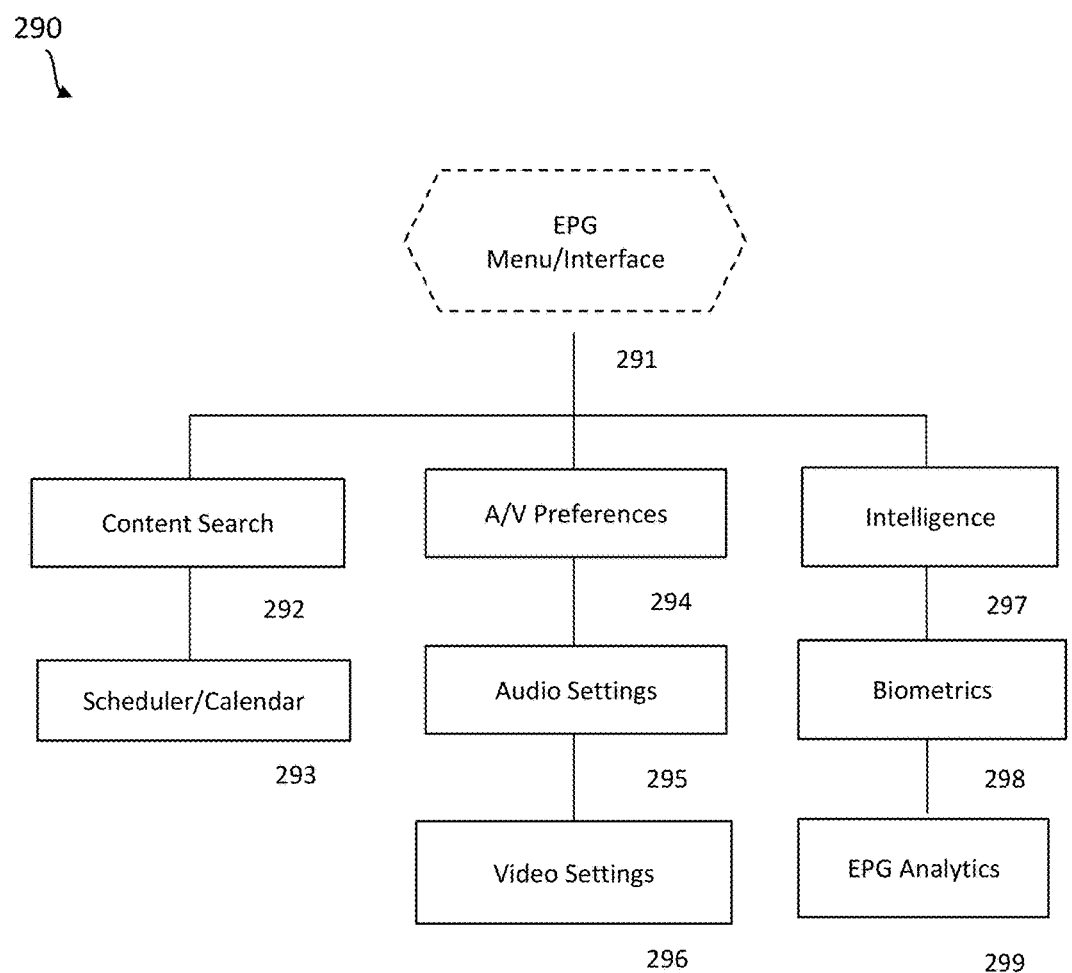
FIGURE 2-C

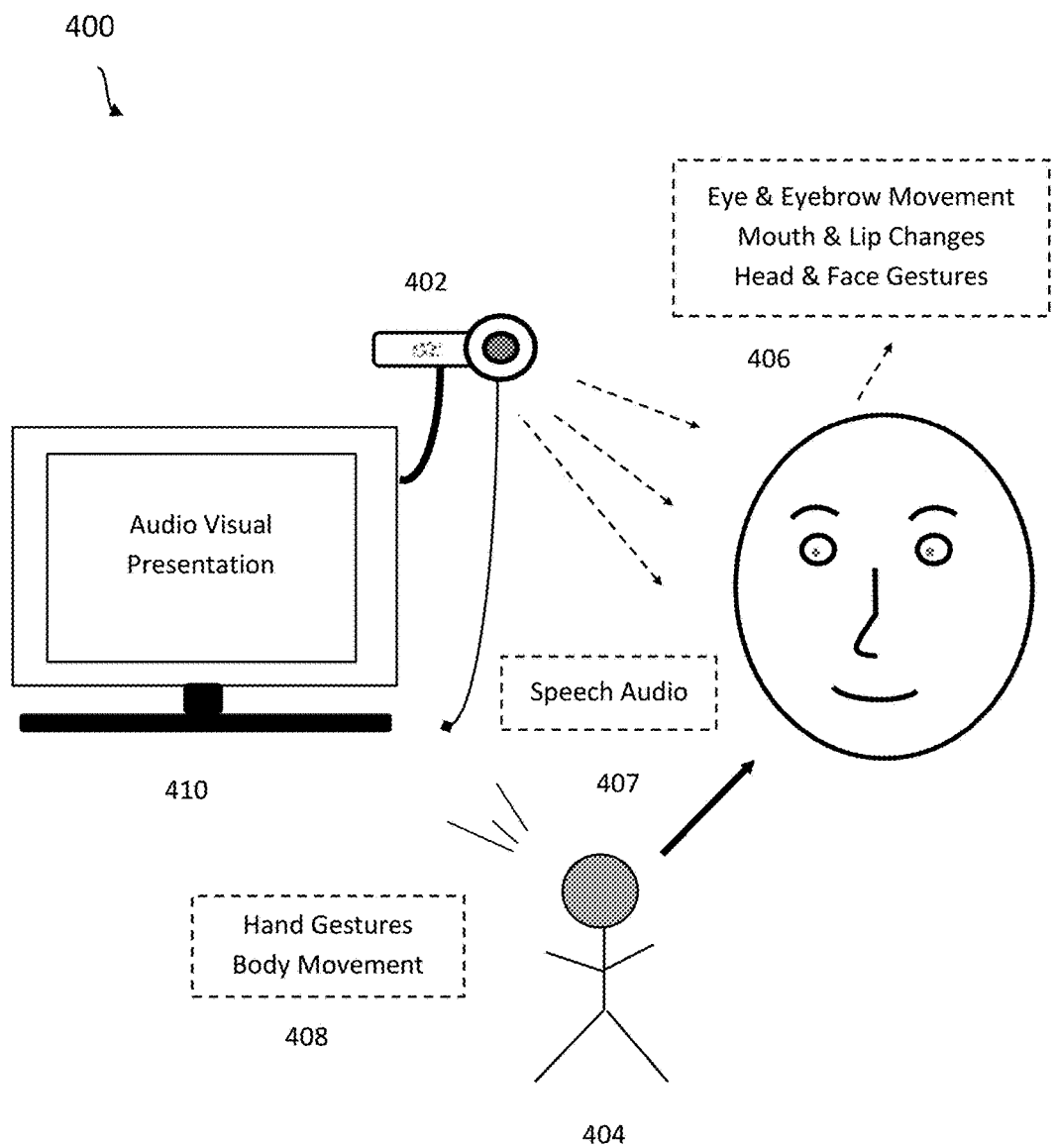
FIGURE 4-A

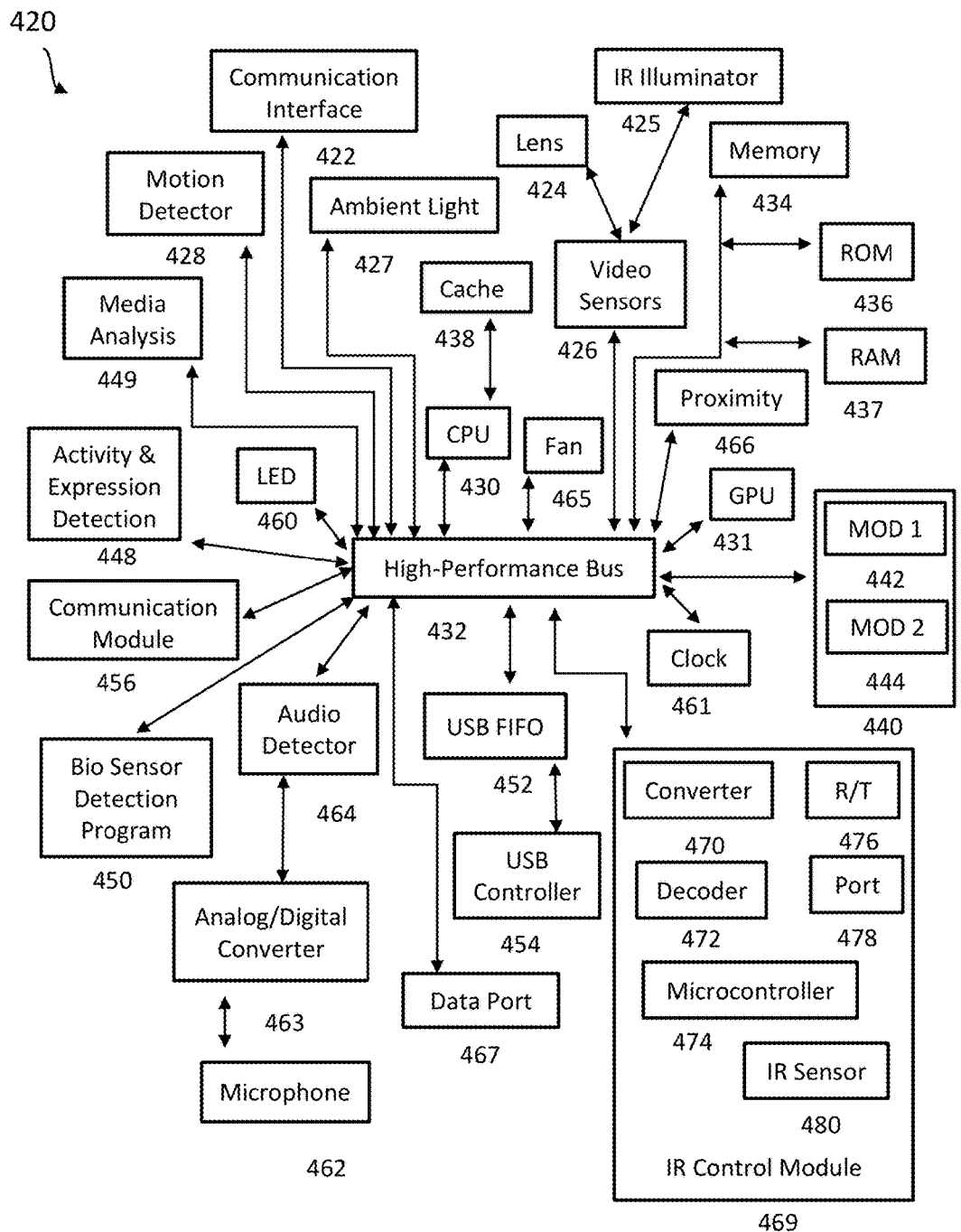
FIGURE 4-B

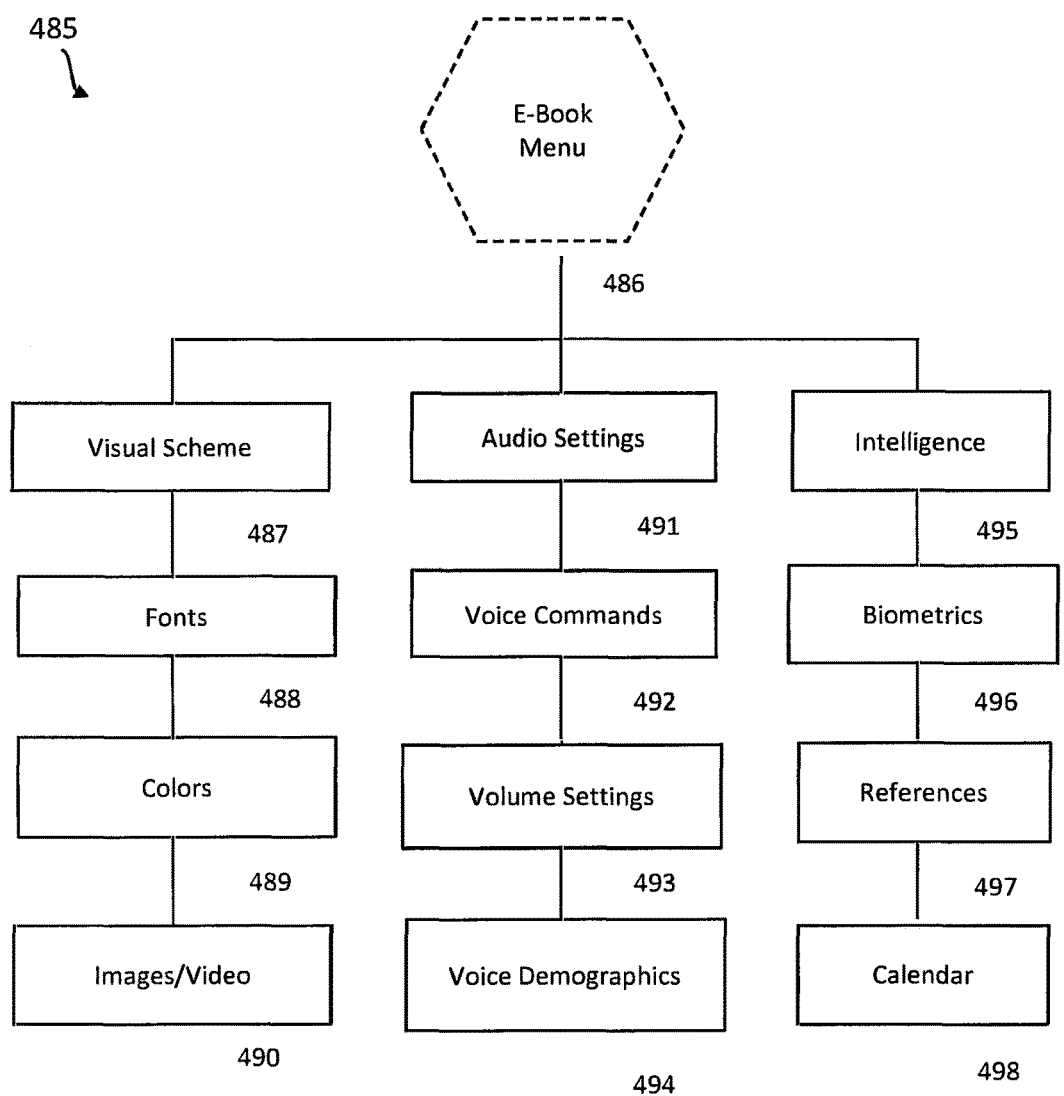
FIGURE 4-C

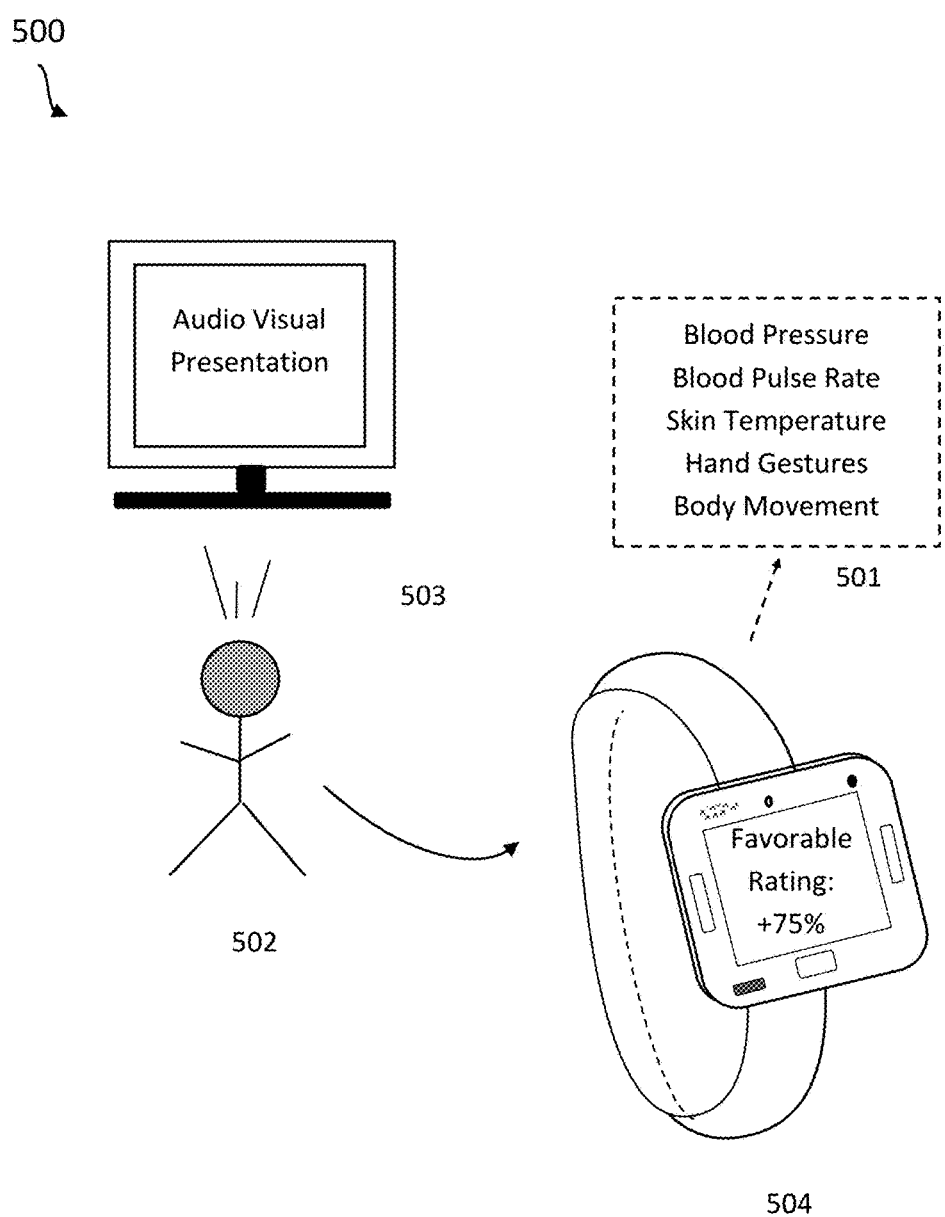
FIGURE 5-A

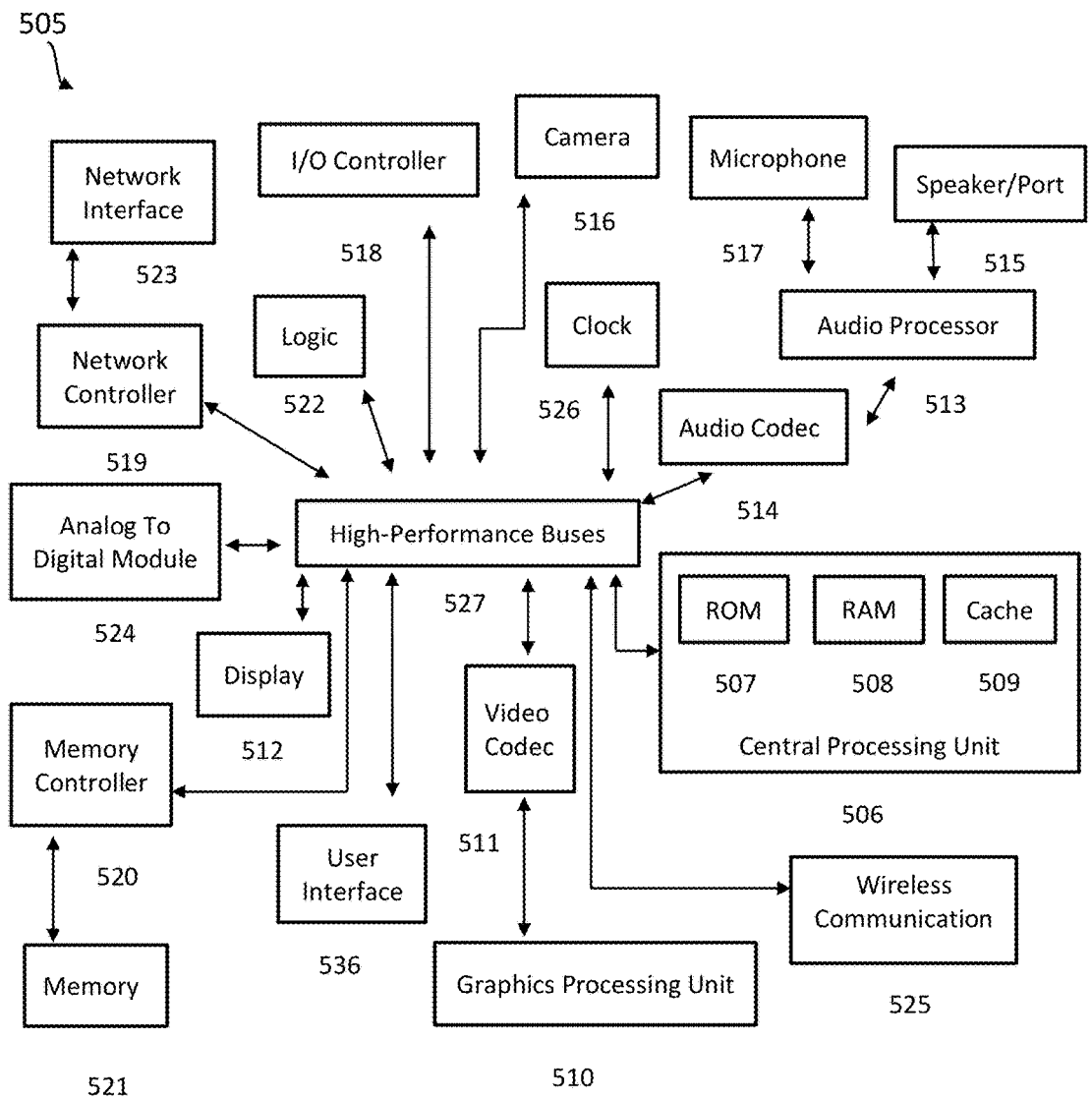
FIGURE 5-B

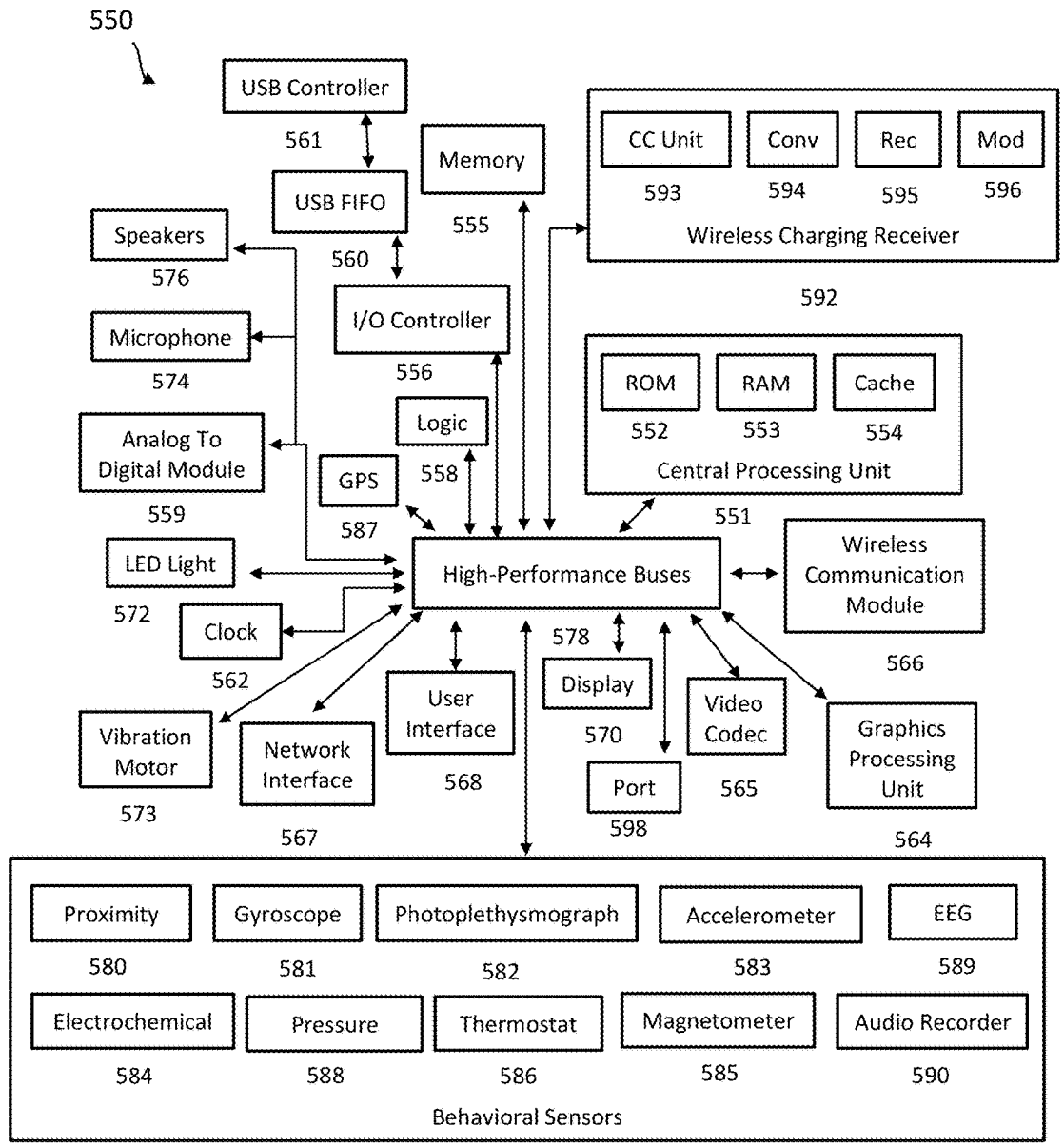
FIGURE 5-C

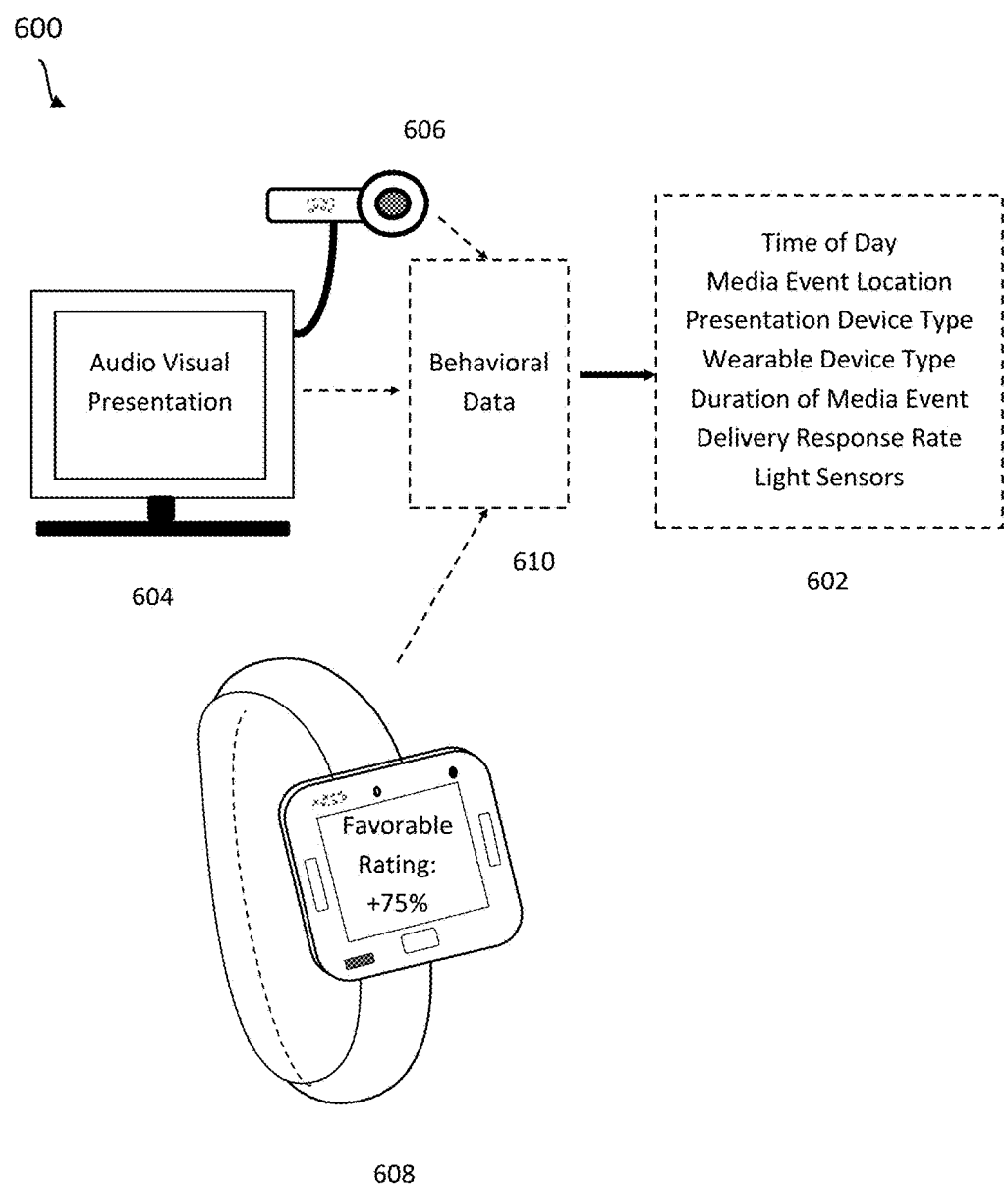
FIGURE 6-A

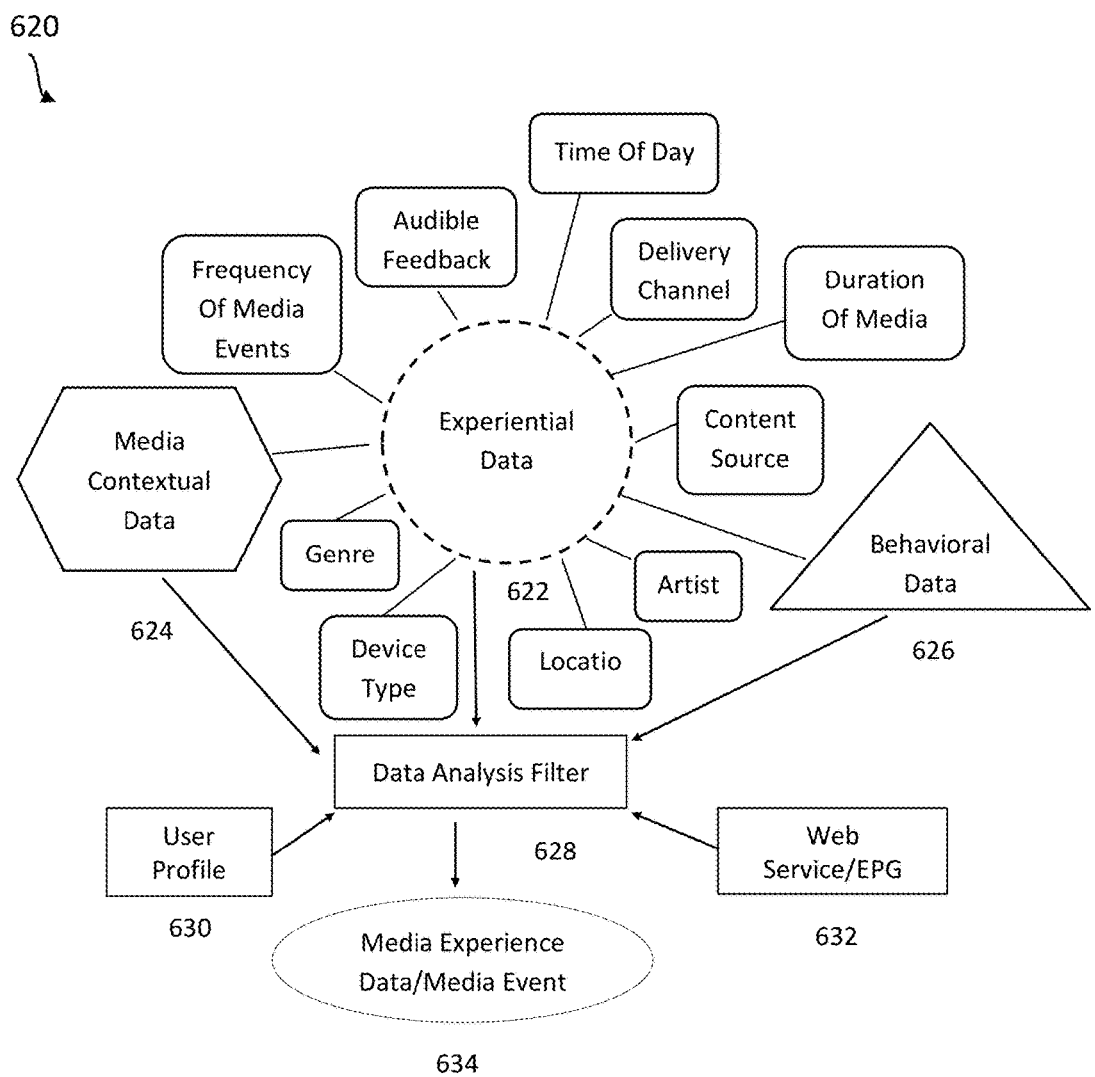
FIGURE 6-B

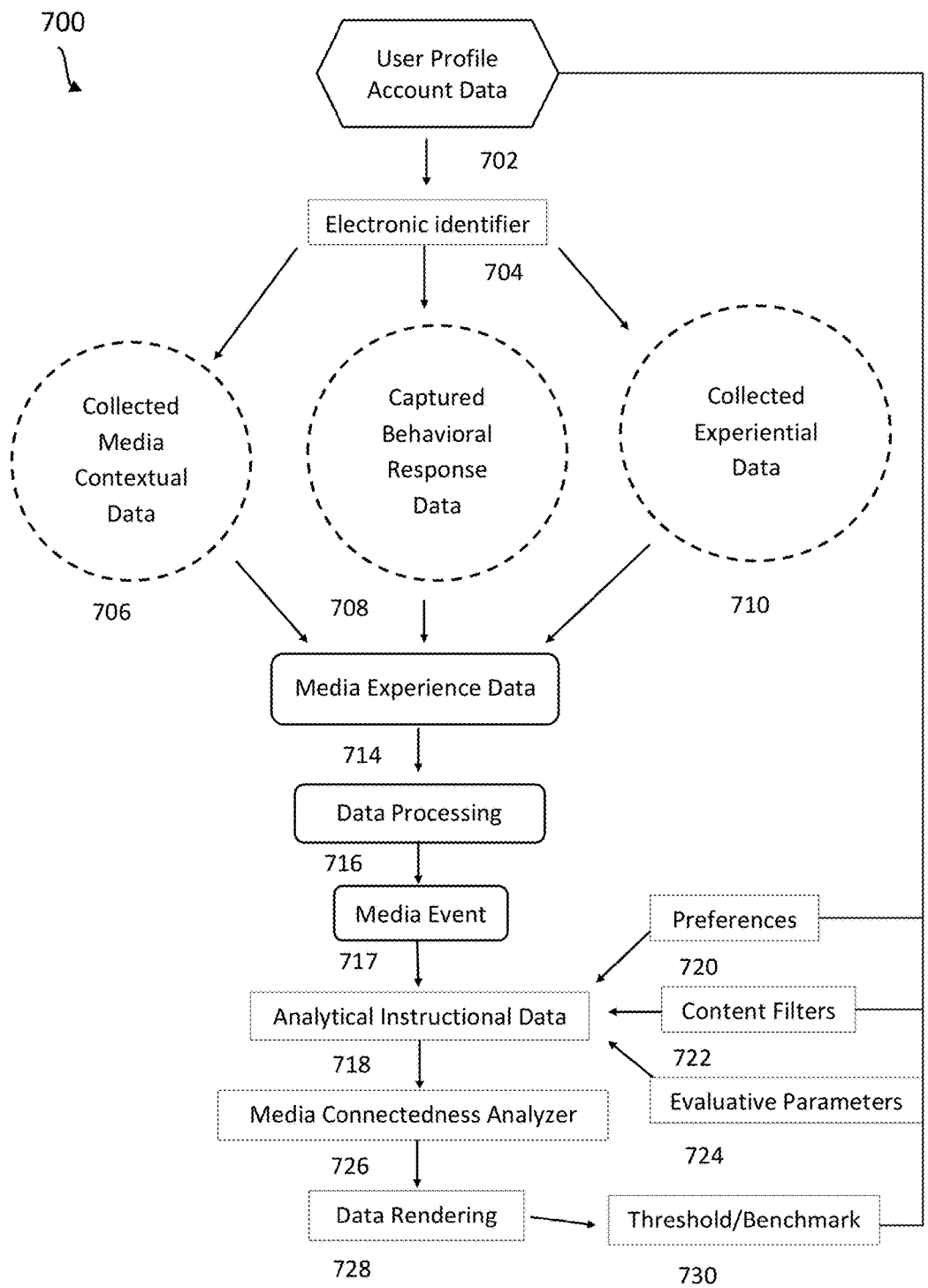
FIGURE 7-A

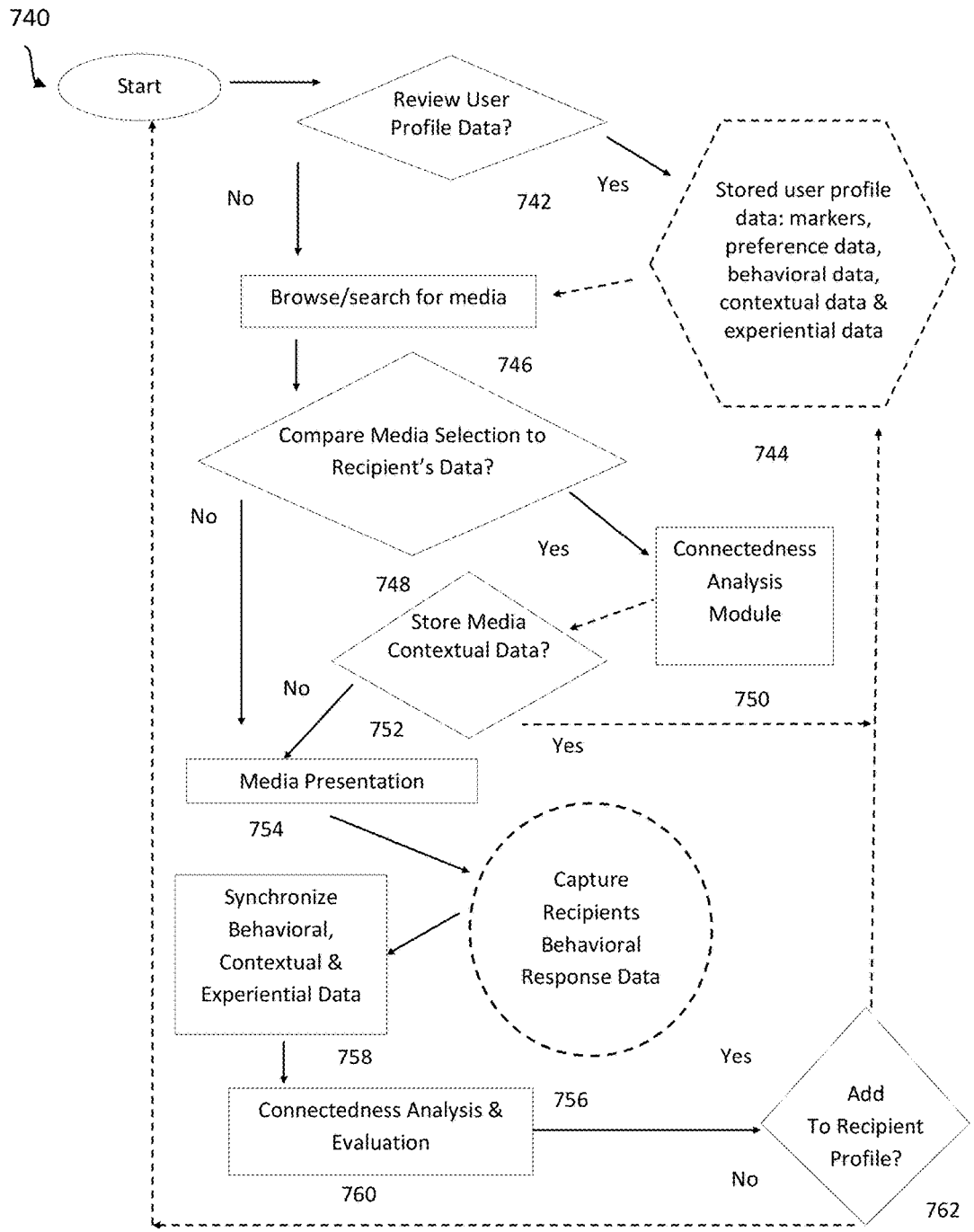
FIGURE 7-B

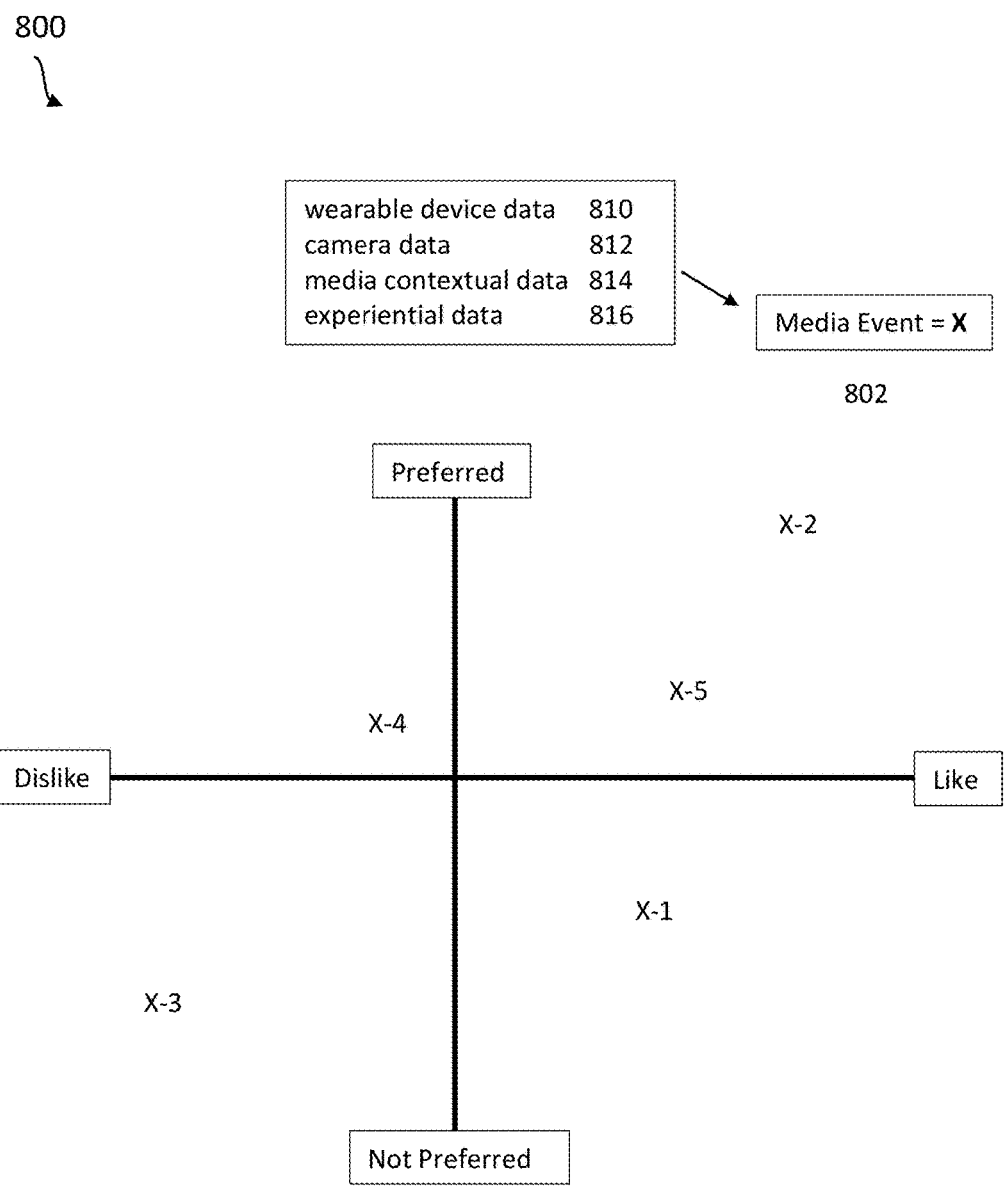
FIGURE 8-A

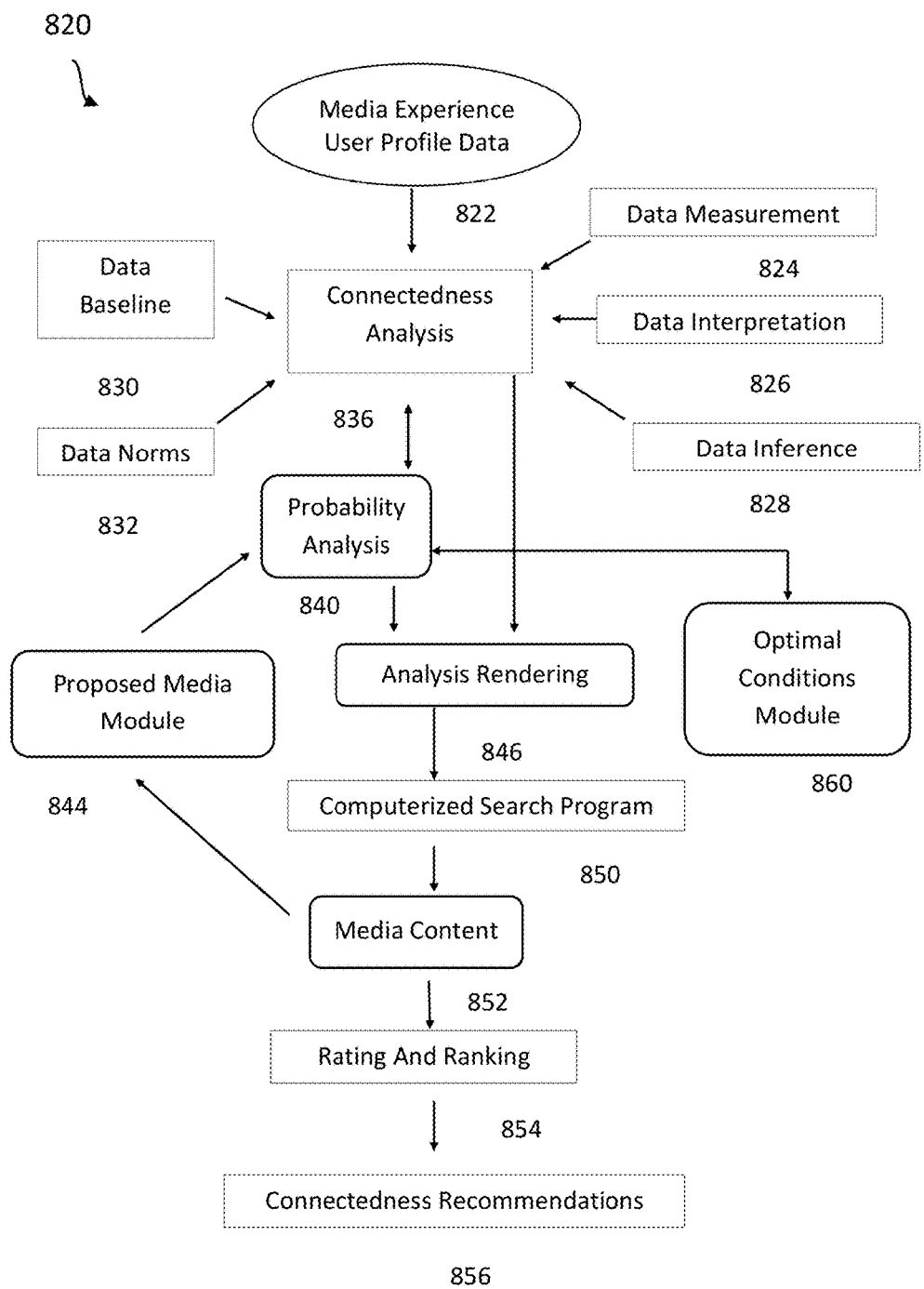
FIGURE 8-B

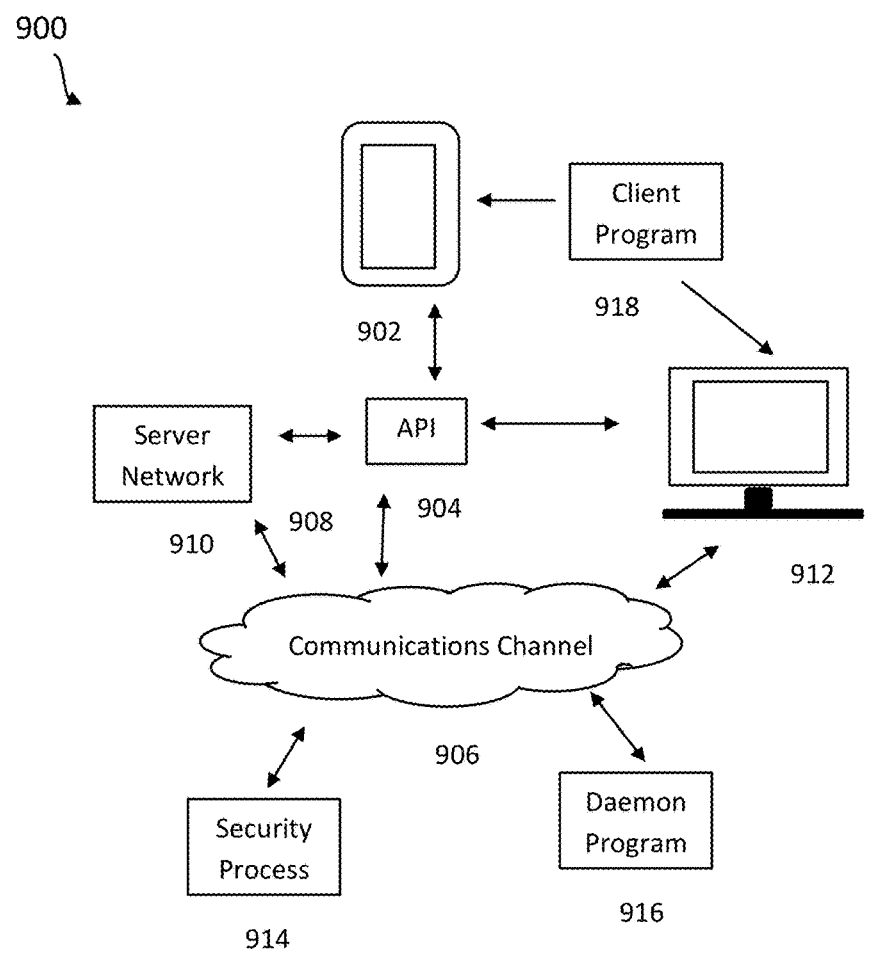
FIGURE 9-A

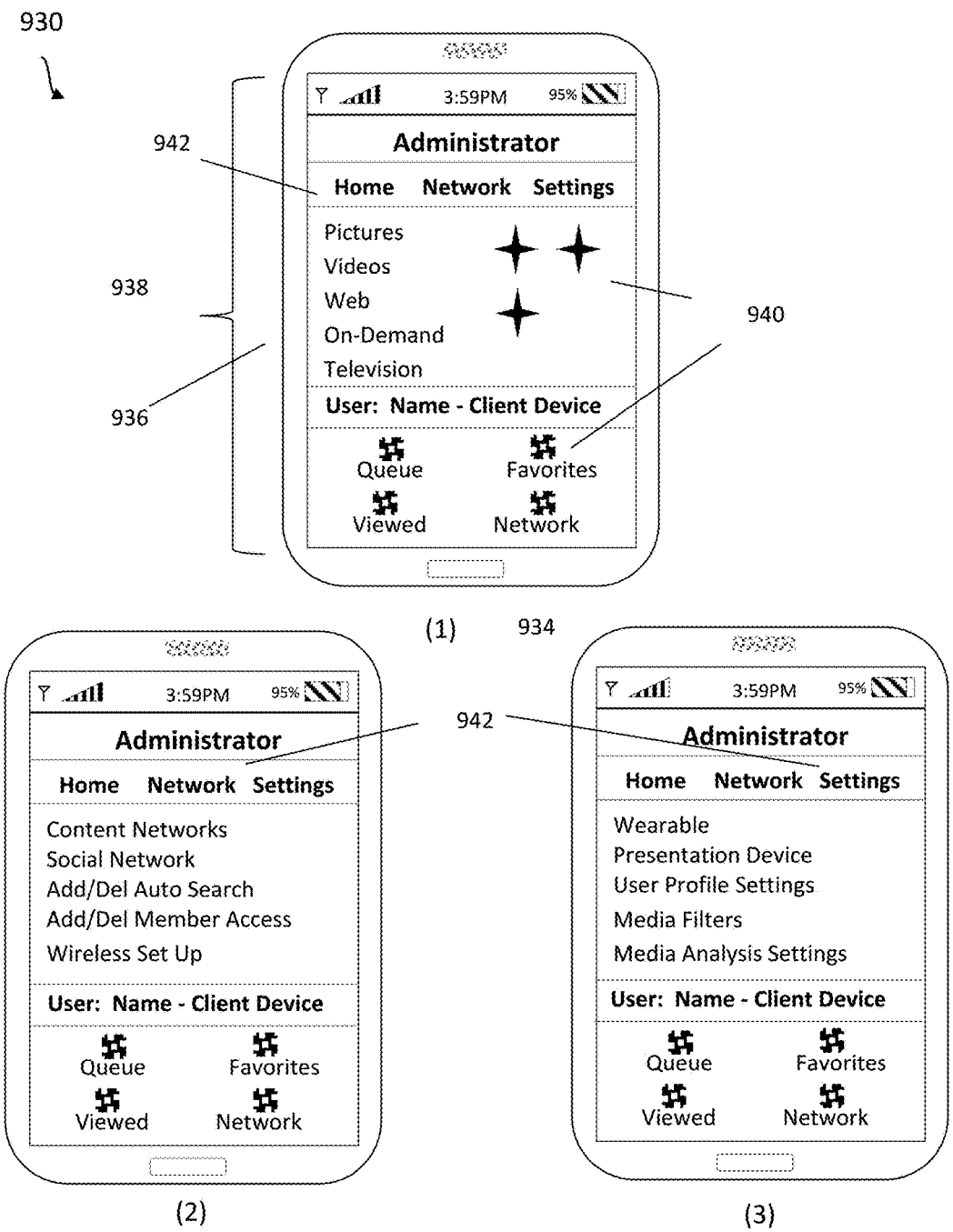
FIGURE 9-B

SYSTEM AND METHOD FOR MEDIA EXPERIENCE DATA

CROSS REFERENCE TO RELATED DOCUMENTS

This application claims benefit of provisional application Ser. 62/183,605 filed Jun. 23, 2015 entitled "Media Experience Data System And Method."

RELATED U.S. PATENT DOCUMENTS application Ser. No. 62/183,605 filed Jun. 2015.

REFERENCES CITED

U.S. Patent Documents

U.S. Pat. No. 6,167,299 December 2000 Galchenkov U.S. Pat. No. 8,498,942 July 2013 Hug
U.S. Pat. No. 6,584,450 June 2003 Hastings et al U.S. Pat. No. 8,510,516 August 2013 Kottomtharayil et al
U.S. Pat. No. 6,803,945 October 2004 Needham U.S. Pat. No. 8,595,757 November 2013 White et al
U.S. Pat. No. 6,970,098 November 2005 Adams et al U.S. Pat. No. 8,615,510 December 2013 Chi et al
U.S. Pat. No. 7,046,139 May 2006 Kuhn et al U.S. Pat. No. 8,843,825 September 2014 Whitman et al
U.S. Pat. No. 7,656,433 February 2007 Wang et al U.S. Pat. No. 8,863,157 October 2014 Zhang
U.S. Pat. No. 7,055,101 May 2006 Abbott et al U.S. Pat. No. 8,886,847 November 2014 Zheng et al
U.S. Pat. No. 7,403,910 July 2008 Hastings U.S. Pat. No. 8,918,822 December 2014 Varoglu et al
U.S. Pat. No. 7,606,790 October 2009 Levy U.S. Pat. No. 8,954,135 February 2015 Yuen et al
U.S. Pat. No. 7,631,323 December 2009 Green et al U.S. Pat. No. 8,972,220 March 2015 Park et al
U.S. Pat. No. 7,756,753 July 2010 McFarland U.S. Pat. No. 9,110,929 August 2015 Garcia et al
U.S. Pat. No. 8,073,794 December 2011 Amer-Yahia et al
U.S. Pat. No. 9,106,958 August 2015 Kaliouby
U.S. Pat. No. 8,123,419 February 2012 Cirker U.S. Pat. No. 9,171,017 October 2015 Badros et al
U.S. Pat. No. 8,407,055 March 2013 Asano et al U.S. Pat. No. 9,215,290 December 2015 Yuen et al
U.S. Pat. No. 8,150,913 April 2012 Cheah U.S. Pat. No. 9,301,016 March 2016 Archibong et al.
U.S. Pat. No. 8,428,453 April 2013 Spiegel et al U.S. Pat. No. 9,297,903 March 2016 Park et al
U.S. Pat. No. 8,448,084 May 2013 Brichter U.S. Pat. No. 9,335,416 May 2016 Park et al
U.S. Pat. No. 8,464,304 June 2013 Harwell et al

Foreign Patent Documents

CA2758272A1
CN 103919536A
WO2013104005A1
JP2001344352A

OTHER REFERENCES

Romina Palermo; "Are you always on my mind? A review of how face perception and attention interact;" Neuropsychologia 2007, pp. 75-92. cited by other.

Danny Oude Bos; "EEG-based Emotion Recognition—The Influence of Visual and Auditory Stimuli;" Department of Computer Science, University of Twente 2006, pp. 2-11. cited by other.

Sally Davies; "From a frown to a smile, the technology that's in your face. Facial analysis is helping companies discern people's emotion;" The Financial Times Jan. 2, 2014

TECHNICAL FIELD

The present disclosure generally relates to electronic media content search methods. More specifically, the disclosure relates to analyzing behavioral responses collected with wearable device and camera sensors, including physical activity and physiological data, with contextual data associated with media content and experiential information associated with a media presentation.

BACKGROUND

Everyday, millions browse for media content online or searchable databases by inputting general or very specific terms that articulate or convey a subject's tastes and preferences for media content. Passive and subconscious responses to media experiences that are spontaneous, non-verbal or involuntary can also be reliable indicators of a subject's tastes and preferences. Conscious or subconscious response and reaction behaviors such as blushing, laughing, elevated heart rate, blood pressure changes and the like can be identified and measured with wearable and facial recognition technologies.

Captured behavioral data may provide reference points such that evaluation, estimates and predictions of a subject's taste and preference can be measured and articulated. Ongoing collection of experiential data may offer greater statistical reliability and accuracy in determining a subject's tastes and preferences or their "connectedness" to media content varieties. Such a method could support machine learning systems for media content browsing and advanced search functions that successfully interpret behavioral and biometric data.

SUMMARY

Collecting and identifying physiological data, facial expression data, and physical activity data in correlation with media experiences can uniquely reveal a subject's tastes and preferences or "connectedness" to media content. Additionally, analysis of behavioral response data can be enhanced when associated with contextual data embedded in electronic media files as well as experiential data derived from the subject's lifestyle and media viewing habits (e.g., location, time of day, device type, etc.). Given the volume of content and sources of distribution for electronic media, passive collection of media experience data can dramatically improve efficiencies in the content search process. Capturing this information with wearable and camera technologies can provide real time data that is accurate, measurable, and create efficiencies in interpreting media preferences and executing media search applications.

BRIEF DESCRIPTION OF DRAWINGS

The following detailed description of certain embodiments may be understood by reference, and not by way of limitation, to the following figures wherein:

FIG. 2-A is a block diagram of system for collecting and analyzing media event data.

FIG. 2-B is a block diagram of system for obtaining media event data from various media content sources.

FIG. 2-C is a block diagram illustrating a menu interface according to one embodiment.

FIG. 4-B is a block diagram that schematically shows the system 420 for capturing and processing facial expressions, hand and body movements that indicate media connectedness.

FIG. 5-A Is a graphical depiction of a system 500 for capturing behavioral data, including physical and physiological data, associated with media connectedness values.

FIG. 5-B is a block diagram of a presentation device used in a system for collecting, analyzing and sharing media connectedness data.

FIG. 5-C is a block diagram of a wearable system for collecting physical and physiological behavioral data that indicates media connectedness values.

FIG. 6-A is a graphical depiction of an embodiment for capturing experiential data.

FIG. 6-B is an illustration of conditions, elements, attributes and circumstances that include experiential data that indicates media connectedness values.

FIG. 7-A is a flowchart of a method for processing and analyzing media event data that may be used to evaluate and measure media connectedness values.

FIG. 7-B is a method for assigning media connectedness data to a user profile.

FIG. 8-A is a model of dependencies which may be used to determine, infer, and/or interpret connectedness values between a subject and presented media using media experience data.

FIG. 8-B is a flow diagram of the media connectedness value analysis 820

FIG. 9-A is an illustration of a system for remote access management of media experience data over a communications channel.

FIG. 9-B is a graphic depiction of a process for managing and presenting media connectedness data on a computing device.

DETAILED DESCRIPTION

Figure 1:
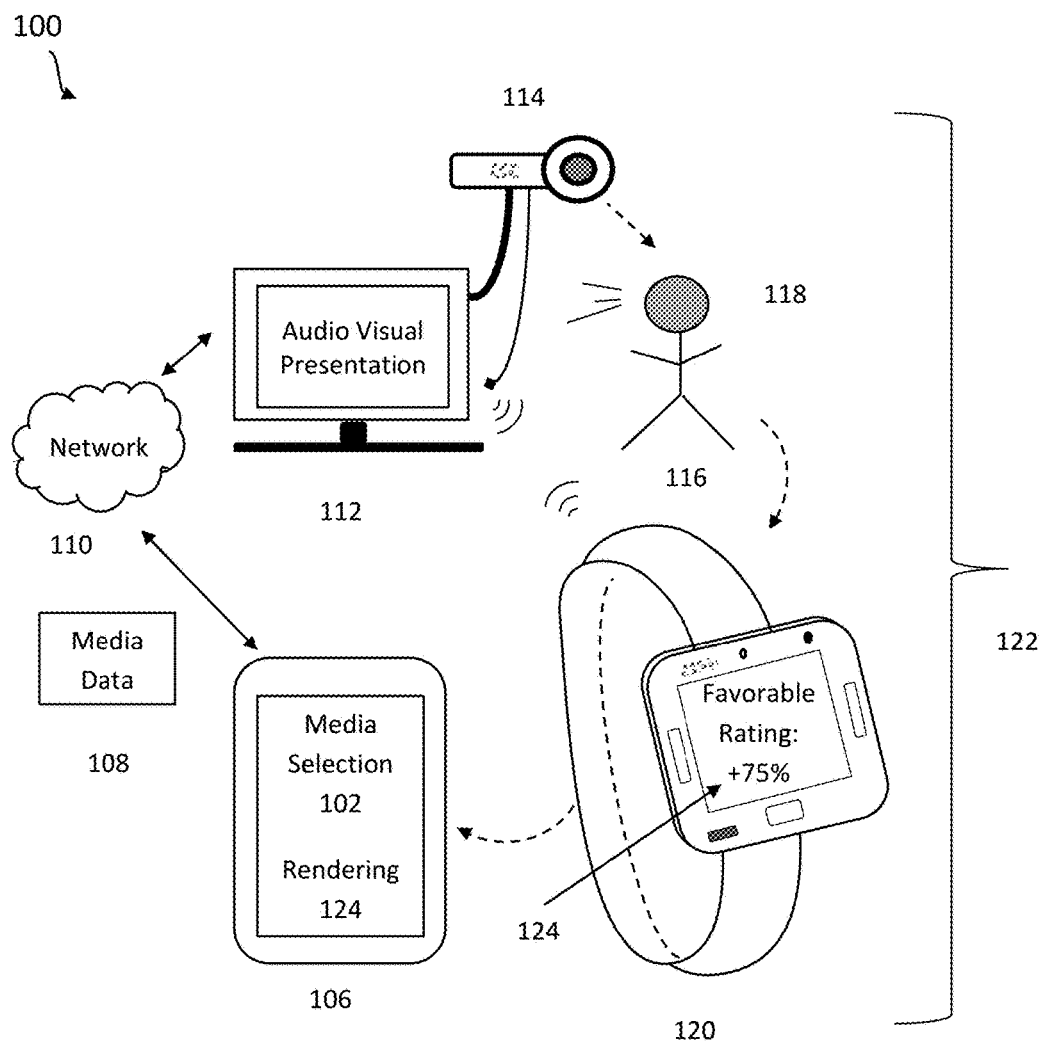
FIG. 1 is a schematic representation of a system for collecting and presenting media experience data according to an illustrative embodiment of this disclosure.

Searching for electronic media is a lifestyle experience for millions of users with devices connected to online and other networked sources. Identifying desired media can involve search terms that are general or very specific, requiring some form of cognitive input that reflects the subject's tastes and preferences. For the unsophisticated user, navigating peripheral devices and networks can be daunting, and the content search experience may be limited by the capacity to operated devices or browsing applications. Considerable time may be consumed in the search query process that delivers the desired content. And, for the technically challenged user, given the complexity of hardware interfaces and networks, there may exist little ability or opportunity to access and enjoy media that reflects their unique tastes and preferences. For this reason, a seamless experience that passively acquires media preference data and delivers media content is highly desirable.

Techniques disclosed herein describe how a system may passively acquire and measure data that measures media connectedness values between a subject and the media they experience using behavioral data, media contextual data and experiential data. It is also desirable to use this information to guide machine learning system searches for media consistent with the subject's media connectedness with increasing accuracy to provide more efficient and satisfying enjoyment of media content.

In this document, the term "connectedness" refers to the interpretations of collected media related data that indicate, in any amount, the existence of a connection (or lack thereof) between the subject and the media being experienced or that may be experienced in the future. The system may use a variety of quantitative, qualitative and machine learning processes to measure media event data and determine what media connection aspects are meaningful to the subject based primarily on non-verbal, passive, and spontaneous behavioral data. This information is correlated with contextual data that identifies the media selection and experiential data collected from media event, respectively.

In this document, the term "media experience data" refers to the total information, including behavioral, contextual and experiential data that is collected, assigned, or correlated with a subject's electronic user profile and the presented media or media of similar type or category. This information is obtained before, during and after their exposure (reading, watching, observing, listening, etc.) and response to various forms of presented media content, which may also be referred to, collectively, as a "media event."

In this document, the term "behavioral data" refers to information collected by a camera or wearable device that measures, records, or tracks the subject's changes in physiological or physical activity. Behavioral data may include a subject's blood pressure, heart rate, skin temperature, eye movements, facial expressions, hand or body movements, and the like.

In this document, the term "media contextual data" refers to any information that identifies or defines a media selection. In one embodiment, media contextual data may be a visual representation of an idea or physical matter not limited to image, photo, graphic, or words. In another embodiment, media contextual data may be embedded electronically in a media file or associated with media content that identifies a media selection by using attributes that can be indexed for search term purposes such as program name, title, category, genre, commentaries, and the like. In many embodiments, this type of information is typically found electronically embedded in media files using meta tags, cookies, and other electronic identifiers and may be obtained from the distribution source, a web service, the Internet or a database.

In this document, the term "experiential data" identifies electronically measurable information that improves a system's and a user's ability to interpret meaning regarding connectedness values, from the media contextual data, the subject's collected behavioral data and/or the overall media event. For example, time of day, location of subject, time stamp of behavior response, device type, recording of the subject's spontaneous utterances and other relevant information may elevate the ability to interpret a subject's media event. Media event contextual data may be obtained from various components in the system.

In this document, the terms "media," "content," or "media content" refer to types of media including text, images, photos, music, audio, videos, web pages, streaming video and the like.

In this document, the term "communication device" refers to an electronic device with firmware, software and hardware, or a combination thereof that is capable of network connectivity, media playback, data storage, and video telephony. A communication device may be fixed or mounted, on a desktop, portable and/or handheld. Typical components of a communication device may include but are not limited to a processor, operating system, RAM, ROM, flash memory, a camera, display, microphone, a cellular antenna, and wired and/or wireless transmission and receiving means' including but not limited to Wi-Fi, WiMax, USB, cellular data networks, Bluetooth, NFC, ANT and RFID. In this document, the term "presentation device" refers to a communication device that is equipped with a camera coupled to software for capturing facial expressions and means for wireless connectivity to a wearable device. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Pert, Python, COBOL, Fortran, ADA, XML, MXML, HTML, DHTML, XHTML, HTTP, XMPP, PHP, and others. The described techniques may be varied and are not limited to the embodiments, examples or descriptions provided.

In this document, the term "social network" refers to a collective network of devices, individual users, web services, web sites, program applications, and media aggregation sources associated with a subject's user profile. The association may be created by automated means or by physical input from a user of the system. Information and data regarding social network activities may be transferred and communicated within the social network of the system to improve analysis and interpretation of media experience data. Analyzed media experience data may be shared to assist the social network efficiencies in locating, comparing, and presenting desirable media content to the subject.

In this document, the term "wearable device" refers to a portable device that is worn about the body, and equipped and with sensors attached to the skin for tracking, monitoring and recording biometrics and physical activity, collectively referred to previously as "behavioral data." Examples of wearable devices include but are not limited to a wristband, watch, arm band, pendant, headband, earpiece, and the like. Sensors may capture biometric data including but not limited to physiological and physical activity such as blood pressure, pulse rate, skin temperature, head and body movements, and hand gestures.

In this document, the term "synchronize" or "sync", "analyze", or "compare" refers to associating behavioral data, media contextual data, and/or experiential data with a specific media event. Synchronization may include a process where a subject's spontaneous behavioral responses are recorded and tracked in real time during the media event. This information is associated with media contextual data previously collected. Lastly, experiential data is also collected and combined with the above data to further increase accurate and consistency in measurements, estimates, inferences, and conclusions regarding media connectedness data values. Synchronization, sync, analysis, or comparison may refer to software, firmware, hardware, or other component that can be used to effectuate a purpose. Software instructions may be stored in a memory of system devices and program instructions are executed with a processor that manages and controls various components.

The present disclosure provides a description of various methods and systems associated with collecting and sharing media experience data that may be used to interpret various aspects of connectedness values between a subject and presented media before, during, and after the media experience or media event.

FIG. 1 is a schematically illustrated system 100 for collecting and sharing media experience data 122. The system components may include a communication device 106, a network 110, a presentation device 112 equipped with a camera 114, and a wearable sensor device 120. The network 110 may include a combination of computers, servers, internet, and cloud based computing and storage systems. Any number of communication devices 106 may have access to the network 110. The communication device 106 may send a media selection 102 and associated data 108, hereinafter referred to as "media contextual" data 108, to the presentation device 112 via the network 110. The presentation device 112 is equipped with audio visual means for presenting the media selection 102. Presenting media may involve an electronic display, broadcast, or playback of the media content, and may include any combination of watching, reading, listening to, and/or observing the media selection 102 which may include any one or more media forms including text, graphics, video, photos, music, voice, audio, and the like.

The presentation device 112 is equipped with a camera 114 that identifies, tracks measures and records audio, facial expressions and body movement during the media presentation. The camera 114 may be equipped with a microphone for capturing audio sounds. The camera 114 may measure movement, gestures or changes to the subject's head, face, eyes, and/or mouth of a subject 116. In one embodiment, the camera 114 may be operated with computer application algorithms that use mathematical and matricial techniques to convert images into digital format for submission to processing and comparison routines. In one embodiment, the facial recognition components may use popular facial recognition techniques such as geometric, three-dimensional face recognition, photometric, Facial Action Coding System, or Principal Component Analysis (PCA) with Eigen faces derived from the covariance matrix of the probability distribution over the high-dimensional vector space of face images, Linear Discriminate Analysis, Elastic Bunch Graph Matching fisher face, the Hidden Markov model, and the neuronal motivated dynamic link matching, and the like. The camera 114 may incorporate one or a combination of the aforementioned techniques to identify a subject's behavioral data including facial expressions, vocal expressions and bodily posture. The presentation device 112 may identify experiential data 118 that reveal the environmental conditions and circumstances of the subject's 116 exposure to the media selection 102. Experiential data 118 involves electronically measurable information that may include but not be limited to plotting locations, time of day, type of device, a timestamp during a media presentation, and the like. The presentation device 112 is connected wirelessly to a device worn by the body of the subject 116, hereinafter referred to as a "wearable" device 120. The wearable device 120 is equipped with sensors that capture physiological and physical activity data before, during and/or after the media presentation.

Individually, media contextual data 108, data from the camera 114, experiential data 118, and data from the wearable device 120 may be identified or tagged by the presentation device 112 with electronic markers. A marker may be identified using a software program or a radio frequency sensor. Collectively, this group may be tagged as a unique data set and will hereinafter be referred to as media experience data 122. Media experience data 122 may be the resulting collective information obtained from pre-existing media selection data compiled with data collected from a subject 116 while exposed to said media selection in various capacities and settings. Exposure may include one or more of the totality of audio, visual, and sensory experiences manifested by reading, watching, observing, listening, etc. to various forms of media content. Examples of a media event in which media experience data 122 is generated may be reading an e-book, observing a web page, looking at family photos, watching a movie, hearing a song, or seeing streaming video. The system 100 may analyze the collected media experience data 122 and render a connectedness data value 124.

FIG. 2-A is a diagram of an example system 200 for collecting, analyzing and sharing media experience data associated with a media selection 202 and media events 211. The system 200 may include an application program interface (API) 210, data manager 212, data analysis 226, and data aggregation 228. The API 210 may be downloaded and installed from a web service 229 on a portable or fixed communication device 201 to establish protocols for software components and network connection 232 between the communication device 201 and the system 200. The API 210 may access the computerized non-volatile or flash memory of the communication device 201 to select media processed by the system 200. The API 210 may access browsing and search functions of the communication device 201 to search for content via a network 232 online and media managed by web services 229 and media aggregation sources 230. The API 210 may allow the user to send and receive information to various components and other users of the system 200. The API 210 may enable a user to log in and operate security or encryption functions available on the communication device 201. The API 210 may provide a means for a user to request the system 200 to assign, store, analyze, retrieve and query data associated with an electronic user profile 224, presentation device 209 and other devices in the system 200.

The API 210 may direct media selections and media event data to the data manager 212. The data manager 212 may provide control for indexing 213, storing 214, and querying 215. The data manager 212 may store and retrieve data from a computerized non-volatile or flash storage memory 220. The data manager 212 may index, store, or query data in accordance with parameters set by an electronic user profile 224. Parameters that direct the data manager 212 and associated data management applications may determine qualitative and quantitative aspects of search queries, preference filters, data capture, and the like. The data manager 212 may analyze a media selection 202 to index 213 and store 214 the media contextual data 204, prior to a request for the system 200 to send the media selection to the presentation device 209. The data manager 212 may access the data aggregation block 228 to locate indices related to media selections 202 from a web service 229, an electronic program guide (EPG) 225 for television media, media aggregation sources 230, and the like. The data manager 212 may analyze and collect media experience information including behavioral data, media contextual data, and experiential data associated with a single media event or multiple media events.

The data manager 212 may control and/or define indexing 213 based on an automated process or prompt for human input. Indexing 213 may be performed in accordance with parameters set by an electronic user profile 224 or by an automated computerized program. Parameters for indexing 213 media selections 202 may include the associated contextual data 204 which includes any electronic information embedded in the electronic file processed by the system to determined connectedness values and measurements. For example, if a search query presents a media selection with embedded contextual data 204 that identifies, describes, clarifies, delineates, and/or distinguishes the media selection for the purposes of determining connectedness between the subject and the content, then that information is added to existing indices or a new index is created in the system. In one embodiment, the subject's user profile preferences may define specific descriptive information (e.g., named title, named artist, named genre, format, etc.) the system may use to narrow queries and create more efficient search results. The data manager 212 may identify data with a single index or combination of indices including but not limited to program name, program title, program length, category, artist(s), author, genre, origin, file size, file type, date created, date modified, publication date, distribution, meta data information and commentary.

Behavioral data from a camera 203 and wearable data 206 may be indexed based on facial expression, physical and physiological changes that indicate a range of favorable or unfavorable responses to media selections. One or more behavioral responses may indicate a subject's preference or lack thereof for a specific media selection. For example, in response to a photo, a frown may indicate displeasure or lack of satisfaction. In another example, in response to a news article, an intense stare without head movement may indicate a definite affinity or interest. In yet another example, in response to a video, a smile, elevated pulse rate, and hand clapping may indicate strong connectedness.

Experiential data 205 may be indexed based on environmental conditions and circumstances that may influence connectedness values and measurements. One or more experiential data 205 values may indicate a subject's preference or lack thereof for a specific media selection. For example, in the morning hours a subject may have a strong preference to read daily news websites compared to entertainment web sites during other hours of the day. In another example, for movie watching, the subject may prefer to watch on a specific presentation device such as a smart TV compared to other smaller or portable devices on the system. In yet another example, the speed of response to an alert indicating a new media selection is available may indicate the best time of day to interact with the subject. In one embodiment, experiential data 205 may include a timestamp that associates a particular behavioral reaction or response from the subject with a specific time during the playback or presentation of media content.

The API 210 may direct media selections and media event data to a data analysis block 226. The data analysis block 226 may include artificial intelligence (AI) or machine learning-grade algorithmic programming and instructions based on known techniques such as pattern recognition, classifiers, fuzzy systems, Bayesian networks, behavior based AI, decision trees, and the like. The data analysis block 226 components may include program code, non-volatile or flash memory 220, and a single processor 222 or multiple processors or a networked group of processors connected to a single or networked group of computerized components. The data analysis block 226 may provide analysis results for media selections 202, media data 204, camera data 203, experiential data 205, wearable data 206, and media event data 211 relating to measuring connectedness value between the subject and the media selection 202 being analyzed. The data analysis block 226 may communicate with various components of the system using the API 210. The data analysis block 226 may operate in conjunction with the data aggregation block 228, data stored in available memory 220, a web service 229, and a media aggregator 230 to provide analysis results.

In one embodiment the data analysis block 226 may provide analysis of media event data 211 that is streaming in real time. In another embodiment the data analysis block 226 pre-screens media before it is sent to the presentation device based on user profile parameters, settings, and content filters. In yet another embodiment the data analysis block 226 may perform analysis of a single data set or multiple data sets to determine connectedness value or measurements. In yet a further embodiment the data analysis block 226 may perform analysis of a single or multiple media events to determine connectedness values or measurements. The data analysis block 226 may receive media selections 202 from the API 210 that were sent from a computer automated media search system managed by a web service 229, an EPG 225 or media aggregator 230. For example, if a search query presents a media selection 202 for presentation that has only a few indices or a small amount of contextual data 204, the data analysis block 226 may operate in conjunction with the data aggregation block 228 to search available sources such as a web service 229 or media aggregator 230 and identify and index additional contextual data for use by the system 200. In another example, media event data 211 renders a particular data set outcome, which may be used as a threshold or benchmark to determine connectedness. This benchmarked media event data set 211 may be analyzed in comparison to past and future media events for reference.

FIG. 2-B is a diagram for a system 240 for using media experience data 259 to identify desired media content from various electronic media content sources 243. The system may interface with media sources including web services such as web sites and search engines 244, an electronic program guides (EPG) 246 from services such as Time Warner Cable, Comcast, Direct TV, Dish Network, media aggregation sources 248 such as YouTube and Pinterest, media libraries located on remote and local servers 250, networked computers 252, social networks 253 such as Facebook, and mobile communication devices 254. The internet or a computerized network 258 may be used for communication between the various devices. Media content may be identified in the system 240 by contextual data 266 including but not limited to program name, program title, program length, category, artist(s), author, genre, origin, file size, file type, date created, date modified, publication date, distribution, meta data information and commentaries. Media content sources 243 may also present contextual data in media catalogs, indices, media libraries, program menus, and program schedules and the like.

In one embodiment, media event data 211 or media experience data 259 may be used, based on thresholds for media connectedness values, to initiate and complete the purchase and delivery of a physical product or download of media content 242 to the presentation device 209 from a media content source 243 with a payment system application and/or an electronic commerce account 284 associated with the user profile 280. For example, if a physical product is identified with contextual data by a web page, video or the like, and the media experience results in media event data 211 or media experience data 259 at or above a specific level, then that product may be automatically purchased via electronic account 284 and delivered to a physical location. Likewise, if a song is presented that results in media event data 211 or media experience data 259 at or above a specific level, then that song may be automatically purchased via electronic account 284 and downloaded to the presentation device 209.

482 electronic program guide EPG 290 2902002 and related systems 400 and 500 below 290 The appropriate source web service 244, media aggregator 248, zip code GPS The menu 291 may be comprised of fields for searchable content information 292 that identifies programming and programming characteristics including but not limited to titles, artists, genres, live broadcasts, metadata descriptors, subject matter, program summaries, and the like. The menu 290 may be synchronized with a scheduler/calendar 293 that associates the available EPG 246 programming with the data rending queue 278 for presentation of a programming playlist of scheduler/calendar may synchronize with the to 200 (240). 290 visual preferences based on user preferences for specific content, time of day, or genre. For example, the A/V preferences 294 may provide for queued content of a specific nature to play at certain hours of the day at a specific volume level. The A/V preferences 294 may be modified according to audio settings 294 for audible levels, measurements, earphone and hearing-aid compatibility and video settings 296 for visual integrity including aspect ratio, high definition/fidelity, brightness, contrast, colors and the like. 290297 analysis module 270, media experience data 259, ranked contextual data 268, activity queue 278, more preferred and less preferred EPG programming viewing and preference analytics 299 The EPG media intelligence 297 settings for identifying, measuring, and reporting data may be configured using biometric settings 298 and EPG analytics 299.

one search 292 and, with compiled recommendations made available to users of the system 200 via the API 260 and data rendering queue 278. experience based 200 ( ) the rendering queue 278 292 may the menu user interface 291 (422, 536, 568), anautomated computer, The system 240 may be managed with an application programming interface (API) 260 that provides protocols for software components to interface with the devices on the system that transfer and exchange data. The API 260 may download or access instructional data from a media content source 243 to aid in media search processes, data transfers and exchanges. The system 240 may generate media experience data 259 that indicates connectedness values between a subject and presented media content 242 by analyzing 270 and associating experiential data 262, behavioral data 264, including physical and physiological information, with contextual data 266 embedded in electronic media files that have been presented to a subject. The system 240 may analyze media experience data 259 in an electronic user profile account 280 to establish norms and baselines for measuring, interpreting, comparing and the like. The system 240 may use these data norms and baseline data sets to identify and rank the contextual data 268 in accordance with media content search instructions input by human means or an automated means managed by the API 260.

The API 260 may use an analysis module 270 to perform a comparative analysis of the identified and/or ranked contextual data 268 to contextual data 266 that identifies and describes media content 242 located on media sources 243. The API 260 may use the analysis module 270 to perform a comparative analysis of media event 211 data sets for reference, as well as individually compiled data points and subsets of the specific media events including camera data 203, wearable data 206 and experiential data 205. For example, if a series of five similar images are viewed and logged as separate media events, the system may compare only the collected experiential data, excluding camera and wearable data, to better establish norms and baselines that may allow the system 240 to better calibrate to an individual's tastes and preferences and develop statistic profiles.

The analysis module 270 may include one or more processors 272, a memory module 274 to store instructions, and network communications module 276 to interface with devices on the system 240. The analysis module 270 may include a computer program application embodied in a non-transitory computer readable medium for media contextual data comparative analysis. The computer program application may include code for collecting media contextual data, code for comparative analysis of media contextual data, and code for rending comparative analysis results. The analysis module 270 and API 260 may sync, download, or work in conjunction with electronic search programming by automated means or human input. The analysis module 270 and API 260 may render 278 media content search results in a variety of forms such as a list, a ranking, a percentage, a graph, an image, alphanumeric text, or the like. The rendered analysis results may also be stored in an electronic user profile account 280. In one embodiment the API 260 and analysis module 270 may interface with an electronic program guide (EPG) 225 or media source 243 that includes a program schedule with contextual data 266 that includes broadcast dates, air time, show times, descriptions, artists, commentaries, and the like. The system 240 may use the program schedule contextual data 266 to sync with a calendar that is managed by the API 260. Schedule updates, alerts and reminders can be utilized and shared between users and devices including remote and local servers 250, networked computers 252, and mobile communication devices 254 in the system 240.

The API 260 may be assigned an electronic marker 282 to identify contextual data 266, behavioral data 264, experiential data 262, media content 242, collective media experience data 259, ranked contextual data 268, and rendered data 278. A marker 282 may be used to identify data, groups of data, an index, or indices. A marker 282 may be used to identify a user profile 280 and associated data. A marker may be used by the data analysis, in aggregation, indexing, assigning and storing functions of the system 240. A marker 282 may be assigned to the location of a media content source 243. A marker may be used to identify various devices, networks, or storage mediums on the system 240. A marker 282 may be used to establish filters for search queries, sorting data, and identifying specific data from media content sources. A marker 282 may be used to assign media content, media contextual data, ranked contextual data, and other information rendered 278 based in an electronic queue of for presentation from various media sources 243.

The API 260 (which may be the same as or similar to the API 210) may be used to initiate a web chat, video conference, or video phone application using the presentation device 209 and camera 114 with applicable programming. The API 260 may be used to initiate a login sequence on a web service 229, media aggregator 230, or EPG 225 that connects and synchronizes the presentation device 209 to the media selection 202 and activities of other users of those systems. For example, the API 260 may be used to manage a login sequence to a social network that enables media content and information to be sent automatically to the presentation device. The API 260 (and API 210) may be used to manage downloaded program applications that remotely operate devices on the system 240. The API 260 (and API 210) may be used in conjunction with the data manager 240 to establish and manage an electronic queue, content filters, and presentation schedule for media content presentations in accordance with user preference settings. In one embodiment, the API 260 (and API 210) may be downloaded by a computer 252, members of a social network 253, or a mobile device 254 to identify and share media content 242 using media experience data 259. In another embodiment, media experience data 259 and ranked contextual data 268 derived from a social network 253 may be compared and shared based on the sender's choices of media content 242 to be presented. For example, if three members of a social network send similar media content on the system, each may receive a ranking of their selection compared to the others based on the connectedness data values rendered by media experience data analysis and ranked contextual data analysis, and data rendering results. In another embodiment, a program may automatically analyze media that is stored, viewed, downloaded, shared, or created on a device and compare the media contextual data to media connectedness values associated with a user profile. If the media connectedness values meet a threshold or benchmark, an audio visual or vibrating alert may be sent to a single users and/or the social network.

The system 240 may enable comparative analysis of media 242 from various media content sources 243 to establish a rating or ranking based on connectedness data values rendered by media experience data analysis and ranked contextual data analysis, and data rendering results. In one embodiment, users of these various media sources 243 may participate in a reward-based virtual game for sharing media ranked and rated using connectedness data values, by volume, highest value measurements, time based measurements, number of participants, most presented, and any combination of the like. For example, a single or group of remote users 253 of the system 240 may submit multimedia content 243 such as video clips or images to be presented to a subject whom, based on the analysis and presentation of ranked and rated connectedness data, will reveal to the remote group which of the content submissions was more or less favorable, desirable, studied, analyzed, and the like. In another example, multimedia content 243 may be presented to a subject wherein the subject's behavioral data is measured along with spontaneous comments and speech about the content that is simultaneously time stamped, recorded, transcribed, logged, and ultimately distributed to members of a social network 253.

another delivered interactions.

Figure 3:
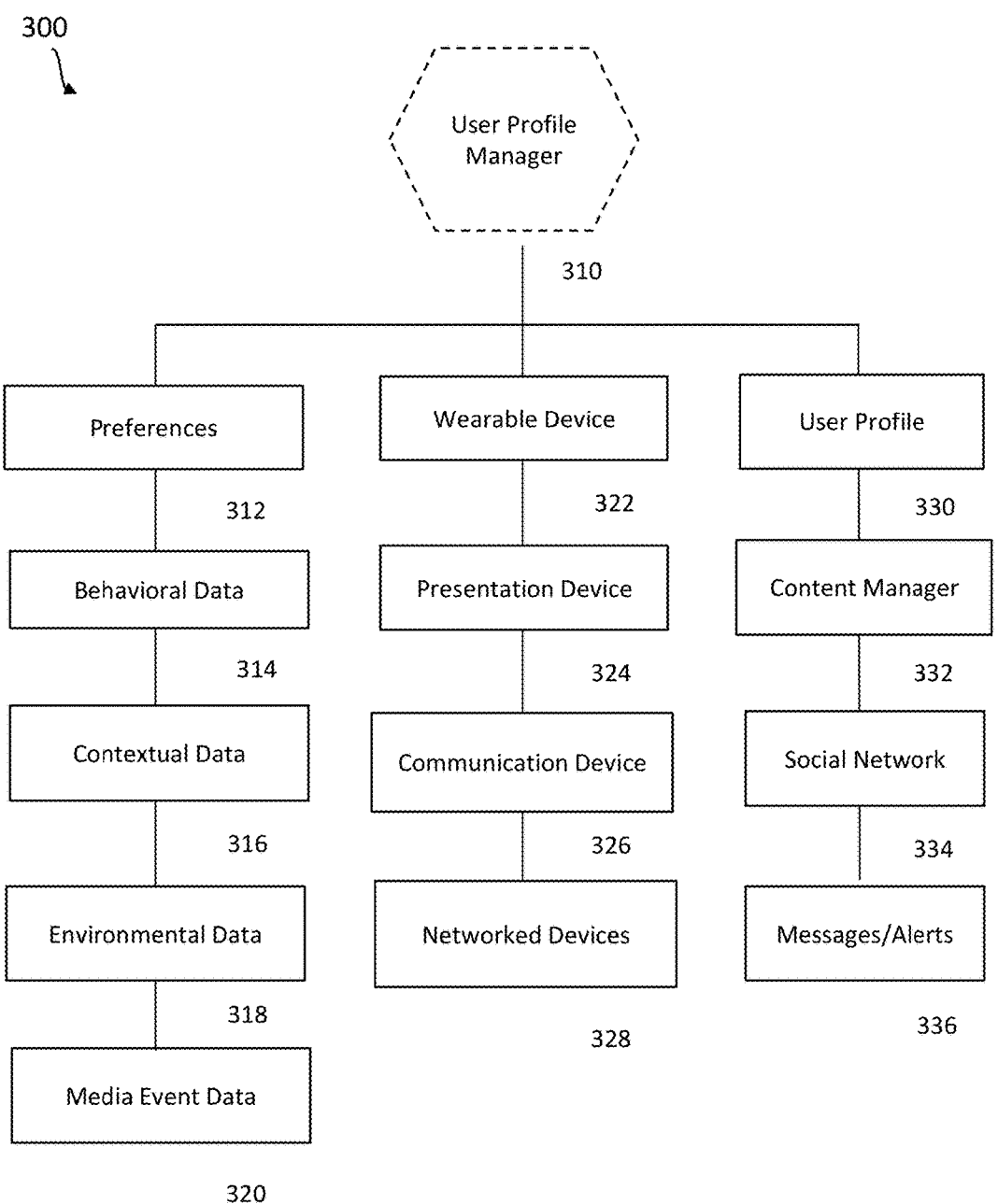
FIG. 3 shows a generalized embodiment of data associated with a subject's user profile including attributes associated with a system for managing media experience data, FIG. 4-A is a graphical depiction of a system for capturing and analysis of facial expressions, physical movement, and speech audio.

FIG. 3. is a graphical depiction of a user profile manager 310 that is used for managing the media content and device activities associated with the subject. The user profile manager 310 can be part of a telemetry system or similar system functioning on a network 110 or a communication device 130. The user profile manager 310 may identify, assign, analyze and associate data or data sets from various components and programming in the system 110. Data may include preference data 312, behavioral data 314, contextual data 316, experiential data 318, and media event data 320.

The user profile manager 310 may be used to manage content, content filters, preference data, and analyzed data with various components of the system including a wearable device 322, a presentation device 324, and a communication device 326; the devices may comprise a network 328 associated with the subject. The user profile manager 310 may be used to assign a unique identity, network administrator, and preferences associated with the subject by maintaining a user profile 330. The user profile manager 310 may manage preferences for search queries or presented media with a content manager 332. The content manager 332 may utilize the data aggregator 260 and data analysis block 226 to identify, sort, and direct media from web services 229 or 244, or media aggregator 230. The user profile manager 310 may manage access to and content flow with a social network manager 334. Content may be shared, transferred, or presented on an automated or request basis with devices and users of the system. The user profile manager 310 may create settings and schedules for information exchanges between devices on the system for new user activity, new content availability, search results, updates, countdowns, media event results, activity thresholds and benchmarks with a message/alert manager 336. In one embodiment, preference data 312 may be used to create parameters for presenting media including but not limited to device type, favorite content, favorite television program, favorite artist/celebrity, time of day, type of device, location, length of program, and/or sleep periods (of inactivity).

FIG. 4-A is a graphical depiction of a system for capturing and analysis of facial expressions, physical movement, and speech audio. A system 400 is shown in which a camera 402 observes a subject 404 and analyzes data that indicates media connectedness. The subject 404 may be human or non-human such as a pet animal kept in a home. Facial expressions 406 may be represented by the upper body, the head, the face or a combination therein that may be observed in real time. Speech audio 407 may be recorded during a media presentation. Physical movement 408 may include a hand gesture, standing, sitting, and the like. The camera 402 may attached to or embedded in a presentation device 410 equipped with instructional programming for recording facial expressions 406 and physical movements 408.

FIG. 4-B is a block diagram that schematically shows the system 420 for capturing and processing facial expressions, hand and body movements that indicate media connectedness. The system 420 may be attached to or embedded in a device managed by a communication interface 422 and operated in accordance with programmed or downloaded instructions. The system may include a lens 424, an infrared (IR) illuminator 425, one or more video sensors 426, an ambient light sensor 427, and a motion detection module 428 to detect and measure a change in orientation or movement within a visible field. The IR illuminator 425 may enable video capture in low light or darkness. The ambient light sensor 427 may allow the video sensors 426 to adjust to low light. The motion detection module 428 may process data from a sensor 426 that interprets depth, range, and physical activity including facial expressions, hand and body movements. A facial expression may be a smile, a frown, a laugh, and the like. Hand and body movements may include a wave, hand clap, pointing, laughing, standing, sitting, and the like. In one embodiment, the system 420 may initiate a command based on a change in lighting detected by the ambient light sensor 427 such as sending a message alert to a device on the system or a social network group, video or audio program playback, video recording, presentation of media content stored in a queue, and the like.

The system 420 includes a processing unit (central processing unit, CPU or processor) 430, a graphics processing unit (GPU) 431 and a system bus 432 that couples various system components including the system memory 434, such as read only memory (ROM) 436 and random access memory (RAM) 437, to the processor 430. The processor 430 may utilize a non-volatile or volatile flash memory 434 for temporary storage. The system 420 can include a cache 438 of high-speed memory connected directly with, in close proximity to, or integrated as part of the processor 430. The system 420 can copy data from the memory 434 and/or the storage device 440 to the cache 438 for quick access by the processor 430. In this way, the cache can provide a performance boost that avoids processor 430 delays while waiting for data. These and other modules can control or be configured to control the processor 430 and GPU 431 to perform various actions such as capturing video, analyze video and picture images, facial detection programming, collecting sensor data, operating television infrared remote control signals, playing a video file, web browsing, music and audio playback, image and picture presentation, reading an audio book, executing an automated media content search on a database, managing social media access, and the like. The processor 430 and GPU 431 can include any general purpose processor or a special-purpose processor with instructions that are incorporated into the actual processor design such as a hardware module (1) 442 and a software module (2) 444 stored in storage device 440, configured to control the processor 430. The processor 430 and GPU 431 may operate according to instructions derived from an activity and expression detection program 448 for identifying gestures and facial expressions, an media data program 449 that analyzes media and media contextual data, or biometric program 450 that interprets biometric sensor activity. The processor 430 may process data using a USB FIFO unit 452 and USB Controller 454. The USB FIFO unit 452 acts as a buffer between various components that supply data to the USB Controller 454 that manages data flow. An advanced high performance bus module 432 may also be used to carry data from the system 420 to other communication devices using a communication module 456. The communication module 456 may be configured for wired or wireless connections including USB, Wi-Fi, Bluetooth, HDMI, cellular data network and the like.

The system 420 may have an LED light 460 that emits multicolor signals. The system 420 may include a clock 461 that is used to determine the schedule for automated functions and communications between devices on the system 420. The system 420 may include a microphone 462. Audio signals captured by the microphone 462 are digitized by an analog to digital converter 463. The audio signals may be processed in accordance with program instructions provided by an audio detection module 464. The system 420 may include a fan 465 for reducing heat inside the device. The system 420 may have a proximity sensor 466 to detect other devices within detectable range. The system may have a data port 467 for external memory input. The system 420 may have an infra-red communication module 469 for remote operation of devices controlled with infra-red controlled functions. The infrared (IR) module 469 is comprised of a digital/IR signal converter 470, a decoder 472, a microcontroller 474, an IR transmitter and receiver 476, port for external IR input/output sensor 478, IR emitter sensor 480, program instructions, and program code for learning IR remote commands. In one embodiment the IR module 468 transmits and receives data over a network to communication devices included program instructions, and remote control commands including input source change, channel change, volume change, mute on/off, channel list, closed captioning functions, viewing aspect ratio, system modes/ settings menu, and activity status of the television including power on/off and display of program information. The processor 430 may essentially be a completely self-contained computing system, containing multiple cores or processors, a bus, memory controller, cache, etc. A multi-core processor may be symmetric or asymmetric.

In one embodiment, the system 420 downloads and stores programming instructions in available memory that enable remote operation of a communication device connected to the system 420 using the communication module 456. In another embodiment, coupled with the audio output of a connected device, the system 420 may be configured with program instructions that enable a web chat, web conference, web phone, and the like. In yet another embodiment, the expression detection program 448 and activity detection program 450 may establish data benchmarks with captured data that are stored (e.g., in the storage 440) and used for referencing previous and future data benchmarks that indicate a connectedness values. In yet another embodiment, the communication module 456 may be configured for operation on a cellular data network using a data plan associated with a user payment account, enabling the system 420 to function where wireless or wired LAN connectivity is not available. 63 interface 6s(and sizes), colors for backgrounds, borders, and fonts 489 and videos 490 settings 12 settings including levels, measurements, earphone and hearing-aid compatibility 3494 eBook 495 activity The menu 485 may also use the machine learning and artificial intelligence in conjunction with electronic references 497 such as online dictionaries, encyclopedia, news publications, and the like in response to a command to interpret a word or phrase heard during an e-book presentation. 58

FIG. 5-A Is a graphical depiction of a system 500 for capturing physical and physiological data. A system 500 is shown which identifies, records, and measures a subject's physical movements and biometric responses 501 that indicate media connectedness. A subject 502 may be a person or an animal that is evaluated. The system may include a presentation device 503 and a wearable device 504.

FIG. 5-B is a diagram of the generalized embodiment of a presentation 505 device that may be used to implement a system 500 for collecting, analyzing and sharing media connectedness data. The presentation device 505 may have a central processing unit 506, a Read Only Memory (ROM) 507, Random Access Memory (RAM) 508, and at least one cache 509 to temporarily store data and improve processing efficiency. The presentation device 505 may have a user interface 536 to manually control device functions. The presentation device 505 may have a graphics processing unit (GPU) 510 and a video encoder/video codec 511 (coder/ decoder) to process high resolution graphic data and present on a display 512. The presentation device 505 may have an audio processing unit 513 and an audio codec 514 for processing and broadcasting high fidelity stereophonic audio to an audio port or external audio speakers 515. The presentation device 505 may include an embedded video camera 516 and microphone 517 for capturing audio visual content from the subject or surrounding environment. The presentation device 505 may include an I/O controller 518, network interface controller 519, memory controller 520, and system memory 521, logic module 522, network interface 523, analog to digital module 524, and wireless communications adapter 525. The I/O controller 518 may manage data input and output to and from the presentation device 505. The logic module 522 may manage automated functions of the device. The network interface 523 may manage connections between the presentation device 505 and a network. The memory controller 520 manages data to and from the presentation device 505 memory 521. The system memory 521, ROM 507, RAM 508, and cache 509 may store application program data and operation commands. The analog to digital module 524 may convert analog signals into digital data. The wireless communications adapter 525 may operate with the network interface 523 to enable wireless access to a network (e.g., private network, local network, or internet) and may include any of a variety of various wired or wireless components including Bluetooth, BLE, WiMax, Wi-Fi, ZigBee and the like.

The presentation device 505 may include a clock 526 that is used to determine the schedule for automated functions and system 500 communications between devices and presentation device 505 functions. The GPU 510, central processing unit 506, network interface controller 519 and various other components of the presentation device 505 are interconnected via one or more buses 527, including serial and parallel buses, a memory bus, a peripheral bus, and a processor or local bus using a variety of bus architectures. In one or more embodiments, the presentation device 505 may be a smart phone, smart television, cell phone, computer, computer tablet, laptop computer, or video monitor. In one embodiment, the presentation device 505 may include a computer program application embodied in a non-transitory computer readable medium for converting text to speech in an audio broadcast. The computer program application may include code for reading alphanumeric character text and information, code for converting text to speech, and code for rending an audible broadcast of the converted text. For example, if a news article from a web site is sent to a presentation device 505, the information may be read to a viewer with a wearable device in accordance with user profile preference settings. In another embodiment, an image and accompanying text message describing the image may be sent to a presentation device 505, and the system 500 will present the audio and visual information simultaneously in accordance with user profile preference settings. In a further embodiment, the presentation device 505, upon receipt of information or media content data delivered by the system 500, may initiate an audio visual alert to devices on the system 500 confirming receipt of the data. In yet a further embodiment, the presentation device 505 may use a clock 526 to synchronize with an electronic calendar that is managed by the system 500.

FIG. 5-C shows a wearable system 550 for collecting physical and physiological behavioral data that relates to media connectedness values. The system 550 may have a central processing unit (CPU or processor) 551, a Read Only Memory (ROM) 552, a Random Access Memory (RAM) 553, and at least one cache 554 to temporarily store data and improve processing efficiency. The processor 551 may utilize a non-volatile or volatile flash memory 555 for temporary storage. The system 550 may include an I/O controller 556, logic module 558, analog to digital module 559, USB FIFO unit 560, USB controller 561, clock 562, graphic processing unit 564, video codec 565, wireless communications module 566, and network interface 567. The CPU 551 and various other components of the wearable system 550 are interconnected via one or more buses 578, including serial and parallel buses, a memory bus, a peripheral bus, and a processor or local bus using a variety of bus architectures. The I/O controller 556 may manage data input and output to and from the system 550. The logic module 558 may manage automated functions of the system 550. The analog to digital module 559 may convert analog signals into digital data. The USB FIFO unit 560 acts as a buffer between various components that supply data to the USB controller 561 that manages data flow. The clock 562 may be used to determine the schedule for automated functions on the device and system 550 communications between devices. The network interface 567 may manage connections between the system 550 and a network. The wireless communications module 566 may operate to enable wireless access to other devices and/or a network (e.g. private network, wide area network, ISP, local network, internet) and may be any of a variety of various wired or wireless components including Bluetooth, BLE, IR, optical, WiMax, RFID, Wi-Fi and the like.

The wearable system 550 may include a user interface 568, display 570, ambient light sensor 572, vibration motor 573, microphone 574, and speakers 576. The user interface 568 may be used to manually control device functions. The display 570 may display graphics, images, pictures, alphanumeric characters, and the like. The microphone 574 may be used to capture audio including audible speech, voice activated speech, voice commands, and ambient sounds. The speakers 576 may be used to broadcast audio sent to the system 550. The ambient light sensor 572 may be used detect changes in light intensity. The vibration motor 573 may be may be used in conjunction with message and alert functions of the system 550.

The wearable system 550 may include behavioral sensors 575 that detect physical and physiological data. Behavioral sensors 575 that measure physical and physiological information may be worn about the body of the subject including but not limited to a wrist, hand, waist, neck, chest, leg or head. The behavioral sensors 575 may include sensors for collecting physical data indicating horizontal and vertical movement, angular movement such as a multi-axis gyroscope 581. An accelerometer 583 sensor may be used to record the rate of movement activity and specific movement patterns. A proximity sensor 580 may be used to detect other devices within a specific range. In one embodiment, the gyroscope and accelerometer data may be analyzed to detect when the subject is asleep, awake, active, clapping, waving, or pointing. The behavior sensors 575 may include physiological sensors for collecting data indicating skin temperature, blood pressure, heart rate, galvanic, EEG, and other physiological responses. A photoplethysmographic sensor 582 may be used to monitor heart rate, blood pressure and oxygen levels. An electrochemical sensor 584 may be used to measure body fluids such as sweat, tears, and pH levels. A magnetometer (digital compass) 585 may define a geographical location and coordinate frame of reference oriented from the Earth's magnetic North pole. A digital temperature thermostat sensor 586 may be used to detect skin temperatures. A Global Positioning System (GPS) receiver 587 can provide the location of the system 550 and define waypoint coordinates. A pressure sensor 588 may be used to detect torsion, bending, or vibrations. An electroencephalogram (EEG) sensor 589 may detect electrical activity in the brain via electrical impulses. An audio recorder 590 may be used to record audio from the subject wearing the system 550. In one embodiment, an automated program function may sample readings from various sensors in to properly calibrate and determine measure accuracy.

The system 550 may use a microphone 574 in conjunction with an audio recorder 590 to enable a program that transcribes voice to text, a program that enables voice activated recording during media content presentations, voice based text messaging, and/or voice activated commands that control functions on the system 550. In another embodiment, the microphone 574 and speaker 576 may also be used in connection with applications for video chat and video conferencing. In yet another embodiment, the proximity sensor 580 may initiate an audio visual alert through the display 570 and/or speaker 576 indicating the system 550 is in or out of range of another device. In yet a further embodiment, the system 550 with a display 570 may confirm receipt of a message, request or alert signal with activation of the vibration motor 573 and/or signal from the speakers 576. Similarly, the system 550 may receive an audio, vibrating, or visual alert confirming (search application) discovery, delivery and/or presentation of media content, text information, or media content data that has been sent from other devices or user accounts with access to the system 550. The vibrating, audio, or visual alert may vary in degree of intensity based upon the degree of media connectedness of the purposed media selection. In still yet a further embodiment, the system 550 may receive time sensitive data, alerts, or messages from devices synchronized with the clock 562 and an electronic calendar managed on a network. For example, the wearable device may receive a countdown timer oriented message indicating the schedule or time of a media presentation, web chat, or other information on the system 550.

The system 550 may have a wireless charging receiver 592 compatible with a rechargeable battery. The wireless charging receiver 592 may use resonant circuits for inductive power transmission. The wireless charging receiver 592 may include communications and control unit 593, converter 594, rectifier 595, and modulator 596. The communications and control unit 593 regulates the transferred power to the level that is appropriate for the components of the system 550. The converter 594 converts transferred power into the required DC voltage. In one embodiment, the wireless charging receiver 592 may deliver functional data to the I/O controller 556 and display 570 including power levels, charging status, low power indication, and recharge time. In another embodiment, the system 550 may have a data/power port 598 used for hardwire recharging and transferring data to an external device including but not limited to biometric data, system data, and device function related data. In a further embodiment, the wireless charging receiver activity and functions may be triggered by a specific biometric data profile comprised of a single or combination of behavioral sensor 575 data measurements, e.g.; the subject is asleep or in a resting status.

FIG. 6-A. is a graphical depiction of a system 600 for capturing experiential data 602. The system 600 may include a presentation device 604, a camera 606, and a wearable device 608. Experiential data 602 may include measurable data that enhances understanding, definition, or clarity of collected behavioral data 610 including but not limited to time of day, device types, media event locations, duration of media events, frequency of media events, device interactivity, media content source, media delivery channel or network, user interactivity and the like. Behavioral data 610 may include physical and physiological data captured by sensors that are worn about the body of a subject including but not limited to a wrist, hand, waist, neck, chest, leg or head. Behavioral data 610 sensors may collect physical data indicating horizontal and vertical movement, angular movement with a multi-axis gyroscope and/or an accelerometer. Behavioral data 610 sensors may collect physiological data indicating skin temperature, blood pressure, heart rate, galvanic, and other physiological responses.

FIG. 6-B. illustrates conditions, elements, attributes and circumstances that may represent experiential data 622 and impact connectedness data values between a subject and presented media before, during, and after a media presentation 620. Data measurements and analysis 628 may be conducted to determine the influence of experiential data 622 on media connectedness data values derived from a media presentation 620; these values are rendered as media experience data or media event data 634. Media event data 634 may include individual data, indices and/or a collective data set including media contextual data 624, behavioral data 626 and experiential data 622. Experiential data 622 may provide clarity, depth, contexts, and refinement to data analysis 628 that evaluates and renders media event data 634. Surrounding the experiential data 622 in FIG. 6-B is a non-exhaustive list of different types of measurable and quantifiable data that may indicate a range of preference values and elements that may impact the media presentation 620 outcome on connectedness data values and interpretations, attributes, inferences that may be applied to media contextual data 624 and behavioral data 626 respectively. Other sources of reference and historical information, such as a user profile 630, web service or electronic program guide 632 may be analyzed 628 to determine the accuracy and consistency of experiential data 622 values.

FIG. 7-A is a flowchart of a process 700 for processing and analyzing media event data that may be used to evaluate and measure media connectedness. The flow may begin with the process 700 using a user profile account data 702 to create an electronic identifier 704. The electronic identifier 704 may be used to define individual data, an index, a data set, or indices. The electronic identifier 704 may be associated by the user profile 702 with media contextual data 706, behavioral data (camera and wearable data) 708 and experiential data 710 to generate a collective media experience data 714. The media experience data 714 may include data, a data point, an index, a data set, groups of data sets, or group of indices. The processing of data 716 may occur in real time utilizing streaming data or take place once the media experience 714 collection concludes. The data processing 716 may aggregate, index, label, assign, synchronize, correlate, associate, compare, count, measure, or calculate the collective data to determine which portion therein will be presented as media event data 717.

The process 700 may use available analytical instructional data 718 stored in the user profile account to define, refine, add context to, and guide quantitative and qualitative evaluations, inferences, and interpretations of media event data as they relate to connectedness with the subject associated with the user profile. Analytical instructional data 718 may include a combination of preferences 720, content filters 722 or evaluative parameters 724. Preferences 720 may determine the priority, hierarchy, or qualifying standard for comparing and associating any or all indices identified in contextual data 706, behavioral data 708, or experiential data 710. Content filters 722 may be used to determine the priority, hierarchy, or qualifying standard for screening or limiting any or all indices associated with media contextual data 706. Evaluative parameters 724 may be used to guide or customize the process 700 regarding the method of analyzing information to affect a particular result. The process 700 may use a media connectedness analyzer 726 to further process and evaluate media event data 717 and media instructional data 718. The process may present the analysis results in a data rendering 728. A data rendering may be presented in a variety of depictions including numerical value, chart, graph, percentage, ratio and the like. Rendered data 728 may also be identified as threshold or benchmark data 730 stored in the user profile 702 for reference, comparison, and evaluation of historical and potential connectedness values. In one embodiment, the data captured and analyzed by the system can be recorded into a standard relational database (e.g., SQL server or the like).

FIG. 7-B is a method 740 for assigning media connectedness data to a user profile. At 742 the user is presented with an option to review user profile data 744 or search for media content 746. If the user elects to search for profile data 744, once found, they may be presented with several categories of data related to media connectedness data values. User profile data 744 can be used to set parameters for the search function 746. For example, if user profile information indicates that a specific media variety is preferred at certain times of the day, then the search function 746 may incorporate those parameters while surveying media content sources. Once a media selection is found, then at 748 the user is presented with an option to evaluate the media selection with a connectedness analysis module 750 and store the media contextual data 752 or present the media 754. Once the media is presented, behavioral response data is captured 756, synchronized with contextual data and experiential data 758, analyzed and evaluated 760. At 762, the user is then presented with the option to add the media experience data to the user profile or return to the initial search mode.

FIG. 8-A depicts a model 800 of dependencies which may be used to determine, infer, and/or interpret connectedness values between a subject and presented media using collected media experience data. In the model of FIG. 8-A, connectedness values may be generally characterized in a correlation between data plots on axis ranges based on like/dislike and preferred/not preferred. The model 800 may include collecting media experience data before, during, and after a media selection presentation to represent media event data 802. A media event data set 802 may include physical and physiological data captured from a wearable device and camera, media contextual data, and experiential data. The wearable device may capture physiological information which may include one or more data measurements of heart rate, blood pressure, skin temperature, and perspiration. The wearable device may capture physical information which may include one or more data measurements of body movement, hand movement, audible sounds, and haptic gestures. The camera may capture physical information which may include one or more data measurements of head movement, body movement, hand movement, facial expressions, eye movement, mouth movement, and audible sounds. For example, each media experience may create a unique media event data 802 plot which represents a connectedness value including collected data (wearable device data 810, camera data 812, media contextual data 814, and experiential data 816).

In one embodiment, baseline data measurements are determined using an algorithmic computerized learning program. For example, a media event plotted at X-2 has the highest evaluation and the media event plotted at X-3 may have the lowest evaluation into a known baseline or norm. Baselines and norms may change over time as more and more data is acquired that refines the correlation of connectedness values to a particular subject and specific media experience. A range of values measured on a continuum between "Like" or "dislike" and "preferred" or "not preferred" may be distinguished based upon one or more measurements of intensity, degree, variance, and frequency of the captured physiological and physical and this data correlation to experiential and media contextual data.

FIG. 8-B depicts a flow diagram of the media connectedness value analysis 820. Analysis of media connectedness data may include any type of analysis including computation of means, standard deviations, correlations, comparisons, modes, data plots, statistical values, proportions, ratios, or percentages. The parameters that determine computational analysis methods may be standardized or vary depending on sufficient availability of data and the desired analysis outcomes. Methods for parameter input may be by human means or established by computerized learning program applications. The flow may begin with collecting media experience data associated with an electronic user profile 822. Analyzing media experience user profile data 822 may include measuring 824, interpreting 826, and inferring 828 connectedness values that reflect variations of a subject's preference for or against a presented media selection, and reflect variations of a subject's like or dislike of a presented media selection.

The flow 820 may include developing data baseline 830 and norms 832 using collected media experience data including physical and physiological data captured from a wearable device and camera, media contextual data, and experiential data. Data baselines 830 and norms 832 may be established to optimize one or more methods that include the media connectedness value analysis 836 process. Data baselines 830 and norms 832 may be developed for media connectedness values based on calculations or may be based on historical connectedness values associated with a particular media selection or subject viewing the presented media selection. Data baselines 830 and norms 832 may be developed with human input based on familiarity with the subject's media tastes, preferences, and lifestyle.

The flow 820 may include determining the probability analysis 840 of connectedness between a subject and media they have already experienced or have never experienced. Using a proposed media module 844, the contextual data of a proposed media selection is processed in conjunction with a probability analysis 840 of one or more of the available media experience data categories to attribute predictions and/or forecasts of connectedness values of a subject to the proposed media selection. The proposed media module 844 and probability analysis 840 may compare and measure historical media experience user profile data 822 with the proposed media selection data using a combination of machine learning, artificial intelligence and/or algorithmic calculation programs. The flow 820 may generate an analysis rendering 846 in various depictions of connectedness values.

Connectedness analysis 836 and analysis rendering 846 may be used by computerized search programs 850 to locate media content 852 stored on local or remote servers, web services, media content aggregators, and the like. Once identified, the proposed media selection contextual data may be evaluated, rated and ranked 854 with a combination of machine learning, artificial intelligence and/or algorithmic calculation programs that compare and measure data to determine comparative order and position based on specific attributes and or parameters related to media connectedness values. Based on the search parameter inputs and one or more of connectedness analysis 836, and probability analysis 840, rating and rankings analysis 854, recommendation rendering 856 may be provided for specific media selections in relation to connectedness data values. These steps may also contribute to establishing data benchmarks, filters, qualifiers, and thresholds using a computerized learning program or developed with human input, based on familiarity with the subject's media tastes, preferences, and lifestyle. Recommendation renderings 856 may be provided to an individual subject, a group of users on a social network, a web service, media aggregator, or a computerized search program in a variety of depictions including numerical value, chart, graph, percentage, ratio and the like.

To help clarify the best circumstances for a presentation to a particular subject, the probability analysis 840 may use an optimal conditions module 860 to establish a baseline and thresholds for ideal circumstances for presenting media to a subject. The optimal conditions module 858 may analyze wearable, camera, and experiential data that is available when the proposed media selection data is evaluated. Based on probability analysis 840 results and a combination of machine learning, artificial intelligence and/or algorithmic calculation programs, the optimal conditions module 860 may recommend the best conditions or parameters for presenting the proposed media based on such factors as the type of media, time of day, device type, subject matter, and the like. Methods for establishing probability analysis 840 parameters and thresholds may be input by human means or established by computerized learning program applications. For example, if the proposed media selection is a news program presented in the morning hours and the subject's media experience profile indicates a preference to show news programming in the evening hours, the proposed media selection will be delivered to a queue for presentation during the evening hours.

FIG. 9-A Illustrates an example implementation of a system 900 for remote access management of media experience data over a communications channel. In the example shown, a communication device 902 may use an application program interface (API) 904 to access a communications channel 906 and manage communications sessions 908 between a server network 910, a presentation device 912, and other devices with network connectivity. A communication device 902 may be a computer, cell phone, smart phone, tablet, laptop and the like. The server network 910 may be a server farm, cloud-based network, or the like. The presentation device 912 may have similar functions as a communications device 902 and may include the technical means that enables the capture of media experience data that indicates media connectedness, such as a camera for capturing facial expressions and means for wireless communications with a wearable device that captures physical and physiological behavioral data. The communications channel 906 can be a Universal Serial Bus (USB), Ethernet, a wireless link (e.g., Wi-Fi, WiMax, 4G), an optical link, infrared link, FireWire, or any other known communications channel or media.

In one embodiment, a security process 914 may be used to secure communications sessions 908. A security process 914 may use a cryptographic protocol, such as Secure Sockets Layer (SSL) or Transport Layer Security (TSL) to provide a secure connection between a communications device 902 and a server network 910, and a presentation device 912. The system 900 may include a daemon program 916 that works with the API 904 to manage the communication sessions 908, including the transmission of commands and data, over the communications channel 906 and server network 910. The API 904 may support a client program 918 that operates on communication devices 902 and presentation devices 912 and provides a set of functions, procedures, commands, and data structures for supporting communication sessions 908 between devices operating on the communications channel 906. The client program 918 may operate using the user interface of devices on the system 900. The client program 918 may allow a user to download or update files, software, search databases for media, store user data, select services, browse web services, locate media content, manage device settings, initiate a web chat, set up preference parameters, set up data thresholds and benchmarks, set up user profiles, remotely operate a device on the network, conduct a data survey, perform financial transactions, and engage an online service or function.

FIG. 9-B Illustrates an example process 930 for managing and presenting media connectedness data on a computing device. The process 930 begins with presenting a first page 934 of user interface elements 936 on the display of a computing device 938. The computing device 938 may be a mobile phone, smart phone, tablet, laptop computer, or desktop computer. The user interface elements 936 may include display objects 940 and/or an application menu 942. In one embodiment, the user interface may be controlled using touch-sensitive controls. In another embodiment, the user interface may be controlled using computer peripheral hardware, such as a mouse and alphanumeric keyboard. Objects 940 displayed may be graphics, pictures, photos, text, icons, symbols or some type of image. Menu 942 displays may include navigation guides that direct the user to different user interface elements 936 and additional pages 934. The process 930 may have a menu format of individual pages 934 designated for but not limited to browsing media, sharing media, analyzing media connectedness values, managing devices, setting up media content filters, creating thresholds and benchmarks for media connectedness values, managing network access, assigning administrative rights to users and devices, assigning access rights to users and devices, managing social network communication access rights and parameters, interfacing with an electronic program guide, managing third-party information, sending text and voice messages, purchasing goods and services, accessing a social network, and managing subscription based media services.

Figure 10:
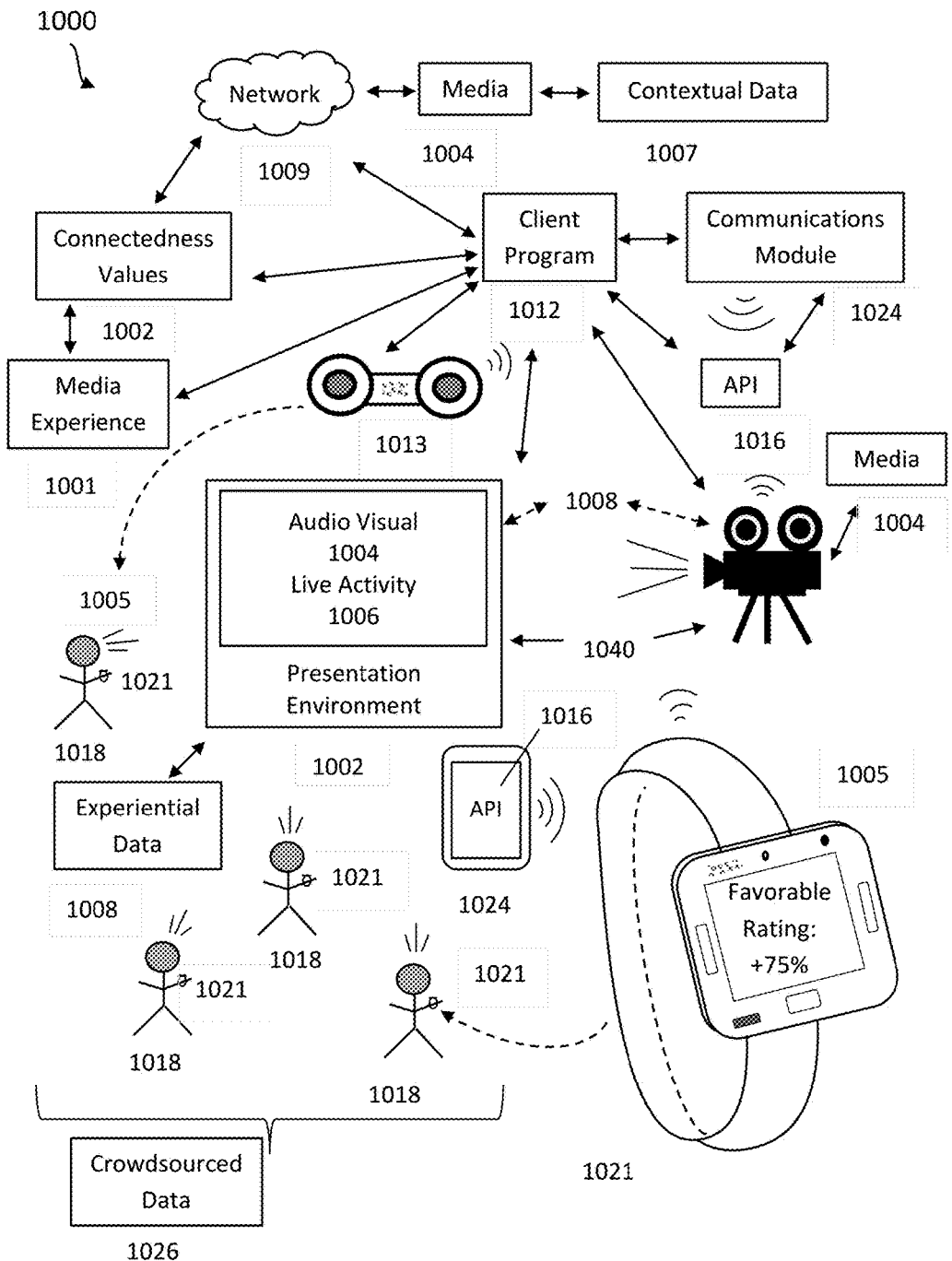
FIG. 10 illustrates an example implementation of a system for capturing and analysis of media experience data in a group or audience setting.

FIG. 10 illustrates an example implementation of a system 1000 for capturing and analysis of media experience data 1001 in a group or audience setting. The system 1000 may analyze the collected media experience data 1001 and render analyzed data results that indicate connectedness values 1002 for an audience or group of subject's 1018. In the example shown, the system 1000 may be comprised of one or more of the following: a network 1009, a client program 1012, an application program interface (API) 1016, a person or subject 1018, a communications module 1024, presentation device 1040, camera 1013, communications device 1024 and wearable device 1021. The system 1000 may operate in presentation environments 1002, including those designed for audio visual presentations 1004 and live activity 1006, that can accommodate a small group or large audience including but not limited to, for example, a movie theater, a cruise ship, a bus, an airplane, a playhouse, a sports stadium or arena, a concert hall for music, a comedy club, a church, a sports bar and the like.

The media experience data 1001, connectedness values 1002, network 1008, API 1016, communications device 1024 and wearable device 1021 may operate in accordance with the purpose, functions and features depicted in FIGS. 1-9 and the respective descriptions therein. Similarly to the systems described previously, in the present system 1000 media experience data 1001 may be comprised of behavioral data 1005 that is captured, measured, and collected from a camera 1013 and wearable device 1021; experiential data 1008 from the presentation environment 1002 including live venue activity 1006 and presentation device 1040; and contextual data 1007 derived from the media selection 1004. Live venue activity 1006 examples may include but are not limited to an athletic competition, an amusement park, a music concert, an art gallery, a play, a speech or oral presentation, a retail store or shopping center, and the like.

The communications module 1024 may enable a wireless ad-hoc network to connect system 1000 devices with the client program 1012, API 1016, and network 1009. Communications module components may include but not be limited to a signal parser; a node core; node table identifier, range finder, and connection storage; peer management code; database adapter; peer to peer hardware adapter; outbox thread; daemon service component for message management, and a broadcast receiver.

The camera 1013, client program 1012, and network 1009 may individually or collectively be operated or controlled by a multiple facial detection and recognition program in real time to identify, monitor, measure, and record behavioral data 1005. The camera 1013 may be equipped with a microphone. The client program 1012 may be comprised of computer application algorithms that use mathematical and matricial techniques to convert images into digital format for submission to processing and comparison routines. In one embodiment, the facial recognition components may use popular facial recognition techniques such as geometric, three-dimensional face recognition, photometric, Facial Action Coding System, or Principal Component Analysis (PCA) with Eigen faces derived from the covariance matrix of the probability distribution over the high-dimensional vector space of face images, Linear Discriminate Analysis, Elastic Bunch Graph Matching fisher face, the Hidden Markov model, and the neuronal motivated dynamic link matching, and the like. The client program 1012 may incorporate one or a combination of the aforementioned techniques to identify behavioral data 1005 including facial expressions, vocal expressions and bodily posture. This information can be organized, processed, collated, compared, and analyzed by the client program 1012 or a remote program connected to the network 1009. The behavioral data 1005 from the camera 1013 can be managed by the client program 1012 or network 1009 program independently or it can be synchronized with behavioral data 1005 from the wearable 1021. Behavioral data 1005 collected by the system 1000 devices can be analyzed, compared, calculated, measured, rendered and presented as media experience data 1001 and/or connectedness values by the client program 1012, API 1016 and/or network 1009 program and displayed on system devices 1000 with display capabilities including the communication device 1024, wearable 1021, and presentation device 1040.

In one embodiment, the presentation environment 1002 may be enable several hardwired connections between the system 1000 devices using a Universal Serial Bus (USB), Ethernet, an optical link, FireWire, Lightning or any other known power and/or data connector. For remote data access via a network 1009 to the client program 1012, communications module 1024, API 1016, and presentation device 1040 and other system 1000 devices operating within the presentation environment 1002, the communications module 1024, presentation devices 1040, cameras 1013, and wearable devices 1021 may include any of a variety of various wired or wireless components including Bluetooth, BLE, WiMax, Wi-Fi, ZigBee and the like. The communication module 1024 may operate based on commands from the client program 1012 to interact with, store subject 1018 and system 1000 data, manage information and data transfers between the network 1009, API 1016, and various components of the system 1000.

Media 1004 content may be delivered remotely via a network 1009 and/or locally by the presentation devices 1040. The presentation devices 1040 may be comprised of a variety of components operating to deliver media 1004 to a presentation environment 1002. Presentation devices 1040 may include but not be limited to a cable or satellite television system, a television/monitor connected to the internet, a video projector and widescreen formatted for display in a theater or large room, and the like. In one embodiment, the system 1000 may enable multiple subjects 1018 to subscribe, login, opt-in, or join a networked connection 1009 using independently or a combination of an API 1016, a communication device 1024, a wearable device 1021. The system 1000 may download or transfer commands, data, control inputs, software updates via a network 1009. The network 1009 connection to a client program 1012 allows for remote management of the system 1000 components including the wireless module 1024, camera 1013, presentation system 1040, and API 1016. The camera 1013 may be enabled with motion detection, facial recognition, infra-red and/or night vision technologies. The client program 1012 may enable the camera to capture random subjects 1018 in the presentation environment 1002 or synchronize wirelessly with wearable devices 1021 to identify specific subjects 1018. Wearable devices 1021 identified by the system 1000 may be periodically synchronized by the client program 1012 and API 1016 with the audio visual program 1004 or live activity 1006 to establish base line data readings, calibrate hardware, improve data measurement and the like to enable more efficient and accurate system 1000 operation, collection of behavioral data 1005, rendering of media experience data 1001 and connectedness values 1002.

The system 1000 may identify, monitor, measure, record, collect, analyze and store experiential data 1008 before, during and/or after an audio visual 1004 presentation or live activity 1006. Experiential data 1008 may include but not limited to the number of subjects 1018 logged in to the system 1000 via communication device 1024, via wearable device 1021 and/or measured, counted, or estimated by the client program 1012 and/or the camera(s) 1013. In the present example, experiential data 1008 may include demographic data associated with a subject's 1018 use of user profile, a communication device 1024 and/or a wearable device 1021 that interacts with the system including GPS location, IP address, images, videos, social media connections, and the like. Experiential data 1008 may also include crowdsourced data 1026 that is actively solicited and/or passively solicited electronically from subjects 1018 and system 1000 devices. For example, at a random or specific point in time before, during and/or after a media 1004 presentation or live activity 1006, the system 1000 may read, capture, measure and analyze the behavioral data 1005 of the subjects 1018, communication device 1024 and wearable device 1021. Crowdsourced data 1026 include user profiles, user information, GPS location data, venue information, opinion surveys, advertisements, promotions, service or product offerings, rank or rating surveys, and the like. The system 1000 may utilize machine learning or artificial intelligence software in the client program 1012 to customize and refine crowdsourced data 1026 interaction and functions with specific subjects 1018 and or devices connected to the system 1000. For example, if an audience survey response reveals a demographic within the group from a specific geographic area, or users of a specific device type/platform, or preference for a particular type of food, the client program 1012 may refine or customize the ongoing and future interaction with that sub-group based on their previous response. This process may repeat in order to refine crowdsourced data 1026.

In the foregoing specification, embodiments of this disclosure have been described as applicable to an implementation anticipating the passive capture and analysis of media experience data, where the special advantages of the system and method are very attractive to consumers of media and members of their social network. However these embodiments may be applied to existing content aggregators and web services that enable various methods for identifying content through search queries or other means.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed:

1. A computer-implemented method for analyzing media experiences comprising:

receiving, by a presentation device, media content including media contextual data, the media contextual data identifying or defining the media content;

presenting, by the presentation device, the received media content;

receiving, by the presentation device, input from a first set of one or more devices, the input indicating at least one physical or physiological condition of a consumer of the presented content while the content is being presented;

generating, by the presentation device, behavioral data based on the received input from the first set of one or more devices, the behavioral data indicating a change in the physical or physiological condition of the consumer in reaction to the presented content;

receiving, by the presentation device, input from a second set of one or more devices, the input indicating one or more electronically measurable physical conditions during the presenting of the content;

generating, by the presentation device, experiential data comprising the received input from the second set of one or more devices associated with the generated behavioral data;

generating, by the presentation device, media experience data correlating the received media contextual data, the generated behavioral data, and the generated experiential data;

generating, by the presentation device, a media event based on presenting the received media content and comprising the generated media experience data;

providing, by the presentation device, the generated media event to a data management system in response to receiving and presenting the media content, the generated media experience data comprising an indication to the data management system of a preference of the consumer related to the media content and media event;

receiving, by the data management system, the media event from the presentation device;

analyzing, by the data management system, the received media event;

generating, by the data management system, based on the media experience data of the analyzed media event, one or more connectedness values for the presented media, the connectedness values comprising indications of a degree of connection of the consumer with the content presented by the presentation device; and rendering, by the data management system, in one or more presentation forms, data that demonstrate qualitative and quantitative aspects of the connectedness values.

2. The method of claim 1 wherein the physical condition of the consumer of the presented content comprises one or more of body movement, hand movement, head movement, eye movement, or facial expressions.

3. The method of claim 1 wherein the physiological condition of the consumer of the presented content comprises one or more of heart rate, blood pressure, skin temperature, or perspiration level.

4. The method of claim 1 wherein media contextual data comprises one or more of an electronic identifier, indices, or descriptive information associated with an electronic media file.

5. The method of claim 1 wherein experiential data comprises one or more of time of day, location of subject, playback device type, frequency of content playback, or length of presentation session.

6. The method of claim 2 wherein the first set of one or more devices comprises a camera.

7. The method of claim 2 wherein the first set of one or more devices comprises a wearable device worn about the subject's body.

8. The method of claim 3 wherein the first set of one or more devices comprises a wearable device worn about the subject's body.

9. The method of claim 4 wherein the media contextual data is embedded in an electronic media file.

10. The method of claim 4 wherein the media contextual data is received by the presentation device from a media content database via a network.

11. The method of claim 5 wherein the second set of devices comprises a wearable device.

12. The method of claim 1 wherein the received media contextual data, the generated behavioral data, and the generated experiential data are correlated in the media experience data using an electronic identifier, key or marker associated with the media event.

13. The method of claim 12 wherein the collected data is added to an existing electronic database account with named category or descriptive indices, or a new index is created accordingly.

14. The method of claim 1 further comprising associating, by a user profile manager, the media event and the media experience data in an electronic user profile associated with the consumer of the presented content.

15. The method of claim 14 further comprising storing, by the user profile manager, the electronic user profile on a network server.

16. The method of claim 1 wherein generating the connectedness value for the presented media content is further based on a stored user profile for the consumer of the presented media content.

17. The method of claim 16 wherein the connectedness value indicates a positive or negative preference of the consumer of the presented media content.

18. The method of claim 16 wherein the connectedness value is based on comparative analysis of historical data categories individually, collected data sets, and groups indices that indicate positive or negative preference of the consumer of the presented media content.

19. The method of claims 16, 17, or 18 wherein the connectedness value is used to anticipate and predict a connectedness value for media content that has not been presented.

20. The method of claim 19 wherein the rendered data includes recommendations of specific media content.

21. The method of claim 16 wherein the media event data is received by the data manager system from a portable communication device through an application program interface.

22. The method of claim 16 wherein the media event data is received by the data manager system from the presentation device through an application program interface.

23. The method of claim 16 wherein the rendered data is represented as alphanumeric text, numerical value, a percentage, a ratio, a graph, a chart, or comparison grid.

24. The method of claim 21 wherein the rendered data is presented on a networked media playback device, communication device, network database, web service, or electronic television programming guide.

25. The method of claim 21 wherein the rendered data is sent to a web service or electronic television programming guide to direct a search query for media content.

26. The method of claim 1 wherein the media experiences comprise one or more of the consumer reading, looking at, watching, or listening to the presented media content.

27. The method of claim 1 wherein the media content comprises video, audio, graphics, photos, or text.

28. A system comprising:
a presentation device comprising a processor and a memory coupled with and readable by the processor and storing therein a set of instructions which, when executed by the processor, cause the processor to:
receive media content including media contextual data, the media contextual data identifying or defining the media content;
present the received media content;
receive input from a first set of one or more devices, the input indicating at least one physical or physiological condition of a consumer of the presented content while the content is being presented;
generate behavioral data based on the received input from the first set of one or more devices, the behavioral data indicating a change in the physical or physiological condition of the consumer in reaction to the presented content;
receive input from a second set of one or more devices, the input indicating one or more electronically measurable physical conditions during the presenting of the content;
generate experiential data comprising the received input from the second set of one or more devices associated with the generated behavioral data;
generate media experience data correlating the received media contextual data, the generated behavioral data, and the generated experiential data;
generate a media event based on presenting the received media content and comprising the generated media experience data;

provide the generated media event in response to receiving and presenting the media content, the generated media experience data comprising an indication to the data management system of a preference of the consumer related to the media content and media event; and a data management server comprising a processor and a memory coupled with and readable by the processor and storing therein a set of instructions which, when executed by the processor, cause the processor to receive the media event from the presentation device;

analyze the received media event;

generate based on the media experience data of the analyzed media event, one or more connectedness values for the presented media, the connectedness values comprising indications of a degree of connection of the consumer with the content presented by the presentation device; and render, in one or more presentation forms, data that demonstrate qualitative and quantitative aspects of the connectedness values.

29. A non-transitory, computer-readable medium comprising a set of instructions stored therein which, when executed by a processor, causes the processor to analyze media experiences by:

receiving, by a presentation device, media content including media contextual data, the media contextual data identifying or defining the media content;

presenting, by the presentation device, the received media content;

receiving, by the presentation device, input from a first set of one or more devices, the input indicating at least one physical or physiological condition of a consumer of the presented content while the content is being presented;

generating, by the presentation device, behavioral data based on the received input from the first set of one or more devices, the behavioral data indicating a change in the physical or physiological condition of the consumer in reaction to the presented content;

receiving, by the presentation device, input from a second set of one or more devices, the input indicating one or more electronically measurable physical conditions during the presenting of the content;

generating, by the presentation device, experiential data comprising the received input from the second set of one or more devices associated with the generated behavioral data;

generating, by the presentation device, media experience data correlating the received media contextual data, the generated behavioral data, and the generated experiential data;

generating, by the presentation device, a media event based on presenting the received media content and comprising the generated media experience data;

providing, by the presentation device, the generated media event to a data management system in response to receiving and presenting the media content, the generated media experience data comprising an indication to the data management system of a preference of the consumer related to the media content and media event;

receiving, by the data management system, the media event from the presentation device;

analyzing, by the data management system, the received media event;

generating, by the data management system, based on the media experience data of the analyzed media event, one or more connectedness values for the presented media, the connectedness values comprising indications of a degree of connection of the consumer with the content presented by the presentation device; and rendering, by the data management system, in one or more presentation forms, data that demonstrate qualitative and quantitative aspects of the connectedness values.

* * * * *